United States Patent
Danforth

(10) Patent No.: US 10,103,982 B2
(45) Date of Patent: *Oct. 16, 2018

(54) SYSTEM AND METHOD FOR AUTOMATIC ROUTING OF DYNAMIC HOST CONFIGURATION PROTOCOL (DHCP) TRAFFIC

(71) Applicant: Time Warner Cable Enterprises LLC, New York, NY (US)

(72) Inventor: Andrew Danforth, Chantilly, VA (US)

(73) Assignee: TIME WARNER CABLE ENTERPRISES LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/082,111

(22) Filed: Mar. 28, 2016

(65) Prior Publication Data

US 2016/0212044 A1 Jul. 21, 2016

Related U.S. Application Data

(63) Continuation of application No. 13/831,049, filed on Mar. 14, 2013, now Pat. No. 9,300,627.

(51) Int. Cl.
*H04L 12/741* (2013.01)
*H04L 29/08* (2006.01)
(Continued)

(52) U.S. Cl.
CPC .......... *H04L 45/74* (2013.01); *H04L 61/2015* (2013.01); *H04L 61/2061* (2013.01);
(Continued)

(58) Field of Classification Search
CPC .... H04L 45/74; H04L 29/06; H04L 29/12273
(Continued)

(56) References Cited

U.S. PATENT DOCUMENTS 5,675,732 A * 10/1997 Majeti ................. H04N 7/1675
348/384.1
5,922,049 A * 7/1999 Radia ...................... H04L 29/06
709/220
(Continued)

FOREIGN PATENT DOCUMENTS

CN 101494669 A 7/2009

OTHER PUBLICATIONS

Anonymous, DHCP (Dynamic Host Configuration Protocol) Basic, Microsoft Article ID: 169289, downloaded from support.microsoft.com/en-us/kb/169289, Dec. 2, 2012, pp. 1-7.
(Continued)

*Primary Examiner* — Ranodhi Serrao
*Assistant Examiner* — James Fiorillo
(74) *Attorney, Agent, or Firm* — Otterstedt, Ellenbogen & Kammer, LLP

(57) ABSTRACT

At an intermediary dynamic host configuration protocol relay device, over a network, a dynamic host configuration protocol message is obtained from one of a plurality of remote dynamic host configuration protocol relay devices in communication with the intermediary dynamic host configuration protocol relay device over the network. The intermediary dynamic host configuration protocol relay device accesses data pertaining to a plurality of dynamic host configuration protocol back-end servers logically fronted by the intermediary dynamic host configuration protocol relay device. Based on information in the dynamic host configuration protocol message and the data pertaining to the plurality of dynamic host configuration protocol back-end servers, the dynamic host configuration protocol message is routed to an appropriate one of the plurality of back-end dynamic host configuration protocol servers.

20 Claims, 10 Drawing Sheets

(51) Int. Cl.
*H04L 29/12* (2006.01)
*H04L 12/24* (2006.01)
*G06F 15/16* (2006.01)

(52) U.S. Cl.
CPC ........ *H04L 61/2076* (2013.01); *H04L 67/327* (2013.01); *G06F 15/16* (2013.01); *H04L 29/12* (2013.01); *H04L 29/12773* (2013.01); *H04L 41/0893* (2013.01)

(58) Field of Classification Search
USPC .................... 709/220, 222, 226, 229, 243
See application file for complete search history.

(56) References Cited

U.S. PATENT DOCUMENTS

| | | | | |
|---|---|---|---|---|
| 5,974,453 | A * | 10/1999 | Andersen | H04L 61/10 709/220 |
| 6,636,894 | B1 * | 10/2003 | Short | H04L 12/2856 709/225 |
| 6,952,428 | B1 * | 10/2005 | Necka | H04L 29/12273 370/352 |
| 6,982,953 | B1 * | 1/2006 | Swales | H04L 29/12235 370/216 |
| 6,986,157 | B1 * | 1/2006 | Fijolek | H04L 12/18 370/395.2 |
| 7,107,326 | B1 | 9/2006 | Fijolek et al. | |
| 7,139,818 | B1 * | 11/2006 | Kinnear, Jr. | H04L 29/12273 709/222 |
| 7,152,117 | B1 * | 12/2006 | Stapp | H04L 29/12273 709/245 |
| 7,254,630 | B1 * | 8/2007 | Daude | H04L 29/12009 709/220 |
| 7,290,046 | B1 * | 10/2007 | Kumar | H04L 12/2801 709/223 |
| 7,409,451 | B1 | 8/2008 | Meenan et al. | |
| 7,568,040 | B2 * | 7/2009 | Townsley | H04L 9/3271 709/226 |
| 7,640,340 | B1 * | 12/2009 | Stapp | H04L 29/12273 709/222 |
| 7,792,963 | B2 | 9/2010 | Gould et al. | |
| 8,224,936 | B2 * | 7/2012 | Ford | H04L 41/0806 370/392 |
| 8,484,370 | B1 * | 7/2013 | Coffee | H04W 76/25 709/232 |
| 2003/0056217 | A1 | 3/2003 | Brooks | |
| 2006/0130107 | A1 | 6/2006 | Gonder et al. | |
| 2006/0218252 | A1 | 9/2006 | Ford | |
| 2007/0061458 | A1 | 3/2007 | Lum | |
| 2007/0217436 | A1 | 9/2007 | Markley et al. | |
| 2007/0248085 | A1 * | 10/2007 | Volpano | H04L 12/4679 370/389 |
| 2009/0248794 | A1 | 10/2009 | Helms et al. | |
| 2010/0191813 | A1 | 7/2010 | Gandhewar et al. | |
| 2010/0287266 | A1 * | 11/2010 | Asati | H04L 12/4641 709/222 |
| 2010/0293257 | A1 * | 11/2010 | Kinnear, Jr. | H04L 29/12301 709/221 |
| 2010/0306319 | A1 * | 12/2010 | Brzozowski | G06F 8/65 709/206 |
| 2010/0313236 | A1 | 12/2010 | Straub | |
| 2011/0238793 | A1 * | 9/2011 | Bedare | H04L 45/586 709/220 |
| 2013/0007233 | A1 * | 1/2013 | Lv | H04L 61/2038 709/222 |
| 2013/0024553 | A1 * | 1/2013 | Mittal | H04L 41/0893 709/222 |
| 2013/0046899 | A1 * | 2/2013 | Harrington | H04L 61/6086 709/230 |
| 2013/0097674 | A1 * | 4/2013 | Jindal | H04L 63/0876 726/4 |
| 2013/0151676 | A1 | 6/2013 | Thakkar et al. | |
| 2013/0166737 | A1 * | 6/2013 | Christenson | H04L 69/40 709/224 |
| 2013/0215833 | A1 * | 8/2013 | Ong | H04L 43/0817 370/329 |
| 2013/0238769 | A1 * | 9/2013 | Asati | H04L 61/103 709/220 |
| 2014/0095717 | A1 * | 4/2014 | Danforth | H04L 61/2015 709/226 |
| 2014/0280810 | A1 | 9/2014 | Gabrielson et al. | |
| 2014/0281029 | A1 | 9/2014 | Danforth | |
| 2016/0352581 | A1 | 12/2016 | Danforth et al. | |

OTHER PUBLICATIONS

R. Droms, Dynamic Host Configuration Protocol, IETF RFC 2131, Mar. 1997, pp. 1-42.
R. Droms et al., Dynamic Host Configuration Protocol for IPv6 (DHCPv6), IETF RFC 3315, Jul. 2003, pp. 1-202.

* cited by examiner

SYSTEM AND METHOD FOR AUTOMATIC ROUTING OF DYNAMIC HOST CONFIGURATION PROTOCOL (DHCP) TRAFFIC

CROSS-REFERENCE TO RELATED APPLICATION

This application is a continuation, under 37 CFR 1.53(b), of co-assigned U.S. patent application Ser. No. 13/831,049 of inventor Andrew Danforth, and claims the benefit thereof, said application Ser. No. 13/831,049 having been filed on Mar. 14, 2013, and entitled "SYSTEM AND METHOD FOR AUTOMATIC ROUTING OF DYNAMIC HOST CONFIGURATION PROTOCOL (DHCP) TRAFFIC." The complete disclosure of the aforesaid application Ser. No. 13/831,049 is expressly incorporated herein by reference in its entirety for all purposes.

FIELD OF THE INVENTION

The present invention relates generally to communications systems and methods, and, more particularly, to the dynamic host configuration protocol (DHCP) and the like.

BACKGROUND OF THE INVENTION

Until fairly recently, the cable network was predominantly a vehicle for delivering entertainment. With the advent of the Internet and the rise in demand for broadband two-way access, the cable industry began to seek new ways of utilizing its existing plant. Pure coaxial ("coax") cable networks were replaced with hybrid fiber networks (HFNs) using optical fiber from the head end to the demarcation with the subscriber coax (usually at a fiber node). Currently, a content-based network, a non-limiting example of which is a cable television network, may afford access to a variety of services besides television, for example, broadband Internet access, telephone service, and the like.

One significant issue for a cable operator desiring to provide digital service is the configuration of its network. Designed for one-way delivery of broadcast signals, the existing cable network topology was optimized for downstream (toward the subscriber) only service. New equipment had to be added to the network to provide two-way communication. To reduce the cost of this equipment and to simplify the upgrade of the broadcast cable for two-way digital traffic, standards were developed for a variety of new cable-based services. The first of these standards, the Data Over Cable System Interface Standard (DOCSIS® standard), was released in 1998. DOCSIS® establishes standards for cable modems and supporting equipment. DOCSIS® (Data Over Cable Service Interface Specification) is a registered mark of Cable Television Laboratories, Inc., 400 Centennial Parkway Louisville Colo. 80027, USA, and will be referred to for the remainder of this application in capital letters, without the ® symbol, for convenience.

IP addresses are allocated in blocks known as subnets or prefixes on a network. These addresses are regularly allocated and moved as part of network growth and expansion. A cable modem termination system or CMTS is a piece of equipment typically located in a cable company's head end or hub site, and used to provide high speed data services, such as cable Internet or voice over Internet Protocol (VoIP), to cable subscribers. A CMTS provides many of the same functions provided by the digital subscriber line access multiplexer (DSLAM) in a digital subscriber line (DSL) system.

On a DOCSIS network, IP subnets are allocated on a per-CMTS basis.

The Dynamic Host Configuration Protocol (DHCP) is a network protocol that is used to configure network devices so that they can communicate on an IP network. A DHCP client uses the DHCP protocol to acquire configuration information, such as an IP address, a default route and one or more DNS (domain name system) server addresses from a DHCP server. The DHCP client then uses this information to configure its host. Once the configuration process is complete, the host is able to communicate on the internet.

The DHCP server maintains a database of available IP addresses and configuration information. When it receives a request from a client, the DHCP server determines the network to which the DHCP client is connected, and then allocates an IP address or prefix that is appropriate for the client, and sends configuration information appropriate for that client.

Enterprise DHCP servers are commonly deployed in a cluster configuration where a pair of servers share responsibility for providing leases to a defined set of network infrastructure. In a cable network, a DHCP cluster is responsible for providing DHCP leases to clients configured on a set of CMTSs. Each CMTS is configured with the IP addresses of the two DHCP servers and the servers are configured with the IP address ranges available on the CMTS. A DHCP cluster serves multiple CMTSs, typically grouped by geographic area.

There are many types of IP networks besides cable networks. Other wired IP networks include, for example, digital subscriber line (DSL), fiber to the home, fiber to the curb, and so on. Wireless IP networks include Wi-Fi, wireless ISP (Internet Service Provider), WiMAX, satellite internet, and mobile broadband.

SUMMARY OF THE INVENTION

Principles of the present invention provide a system and method for automatic routing of dynamic host configuration protocol (DHCP) traffic. In one aspect, an exemplary method includes the steps of obtaining, at an intermediary dynamic host configuration protocol relay device, over a network, a dynamic host configuration protocol message from one of a plurality of remote dynamic host configuration protocol relay devices in communication with the intermediary dynamic host configuration protocol relay device over the network; accessing, by the intermediary dynamic host configuration protocol relay device, data pertaining to a plurality of dynamic host configuration protocol back-end servers logically fronted by the intermediary dynamic host configuration protocol relay device; and, based on information in the dynamic host configuration protocol message and the data pertaining to the plurality of dynamic host configuration protocol back-end servers, routing the dynamic host configuration protocol message to an appropriate one of the plurality of back-end dynamic host configuration protocol servers.

In another aspect, an exemplary system includes an intermediary dynamic host configuration protocol relay device; a map database in communication with the intermediary dynamic host configuration protocol relay device; and a plurality of dynamic host configuration protocol back-end servers logically fronted by the intermediary dynamic host configuration protocol relay device. The intermediary dynamic host configuration protocol relay device is configured to obtain, over a network, a dynamic host configuration protocol message from one of a plurality of remote dynamic host configuration protocol relay devices in communication with the intermediary dynamic host configuration protocol relay device over the network; access the map database, the map database containing data pertaining to the plurality of dynamic host configuration protocol back-end servers logically fronted by the intermediary dynamic host configuration protocol relay device; and, based on information in the dynamic host configuration protocol message and the data pertaining to the plurality of dynamic host configuration protocol back-end servers, route the dynamic host configuration protocol message to an appropriate one of the plurality of back-end dynamic host configuration protocol servers.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a machine readable medium that contains one or more programs which when executed implement one or more method steps set forth herein; that is to say, a computer program product including a tangible computer readable recordable storage medium (or multiple such media) with computer usable program code for performing the method steps indicated. Furthermore, one or more embodiments of the invention or elements thereof can be implemented in the form of an apparatus (e.g., an intermediary dynamic host configuration protocol relay device) including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s), (ii) software module(s) stored in a tangible computer-readable recordable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:
  simplification of CMTS configuration; only need to configure a single pair of helper addresses;
  in instances where distribution of load among back-end servers is automated, eliminate need for manual intervention by an operator;
  ease in collecting metrics and/or statistics about DHCP traffic in a network as same can be connected from one pair of servers per data centers instead of from a large population of DHCP servers; and
  ability to re-write DHCP packets before seen by servers.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
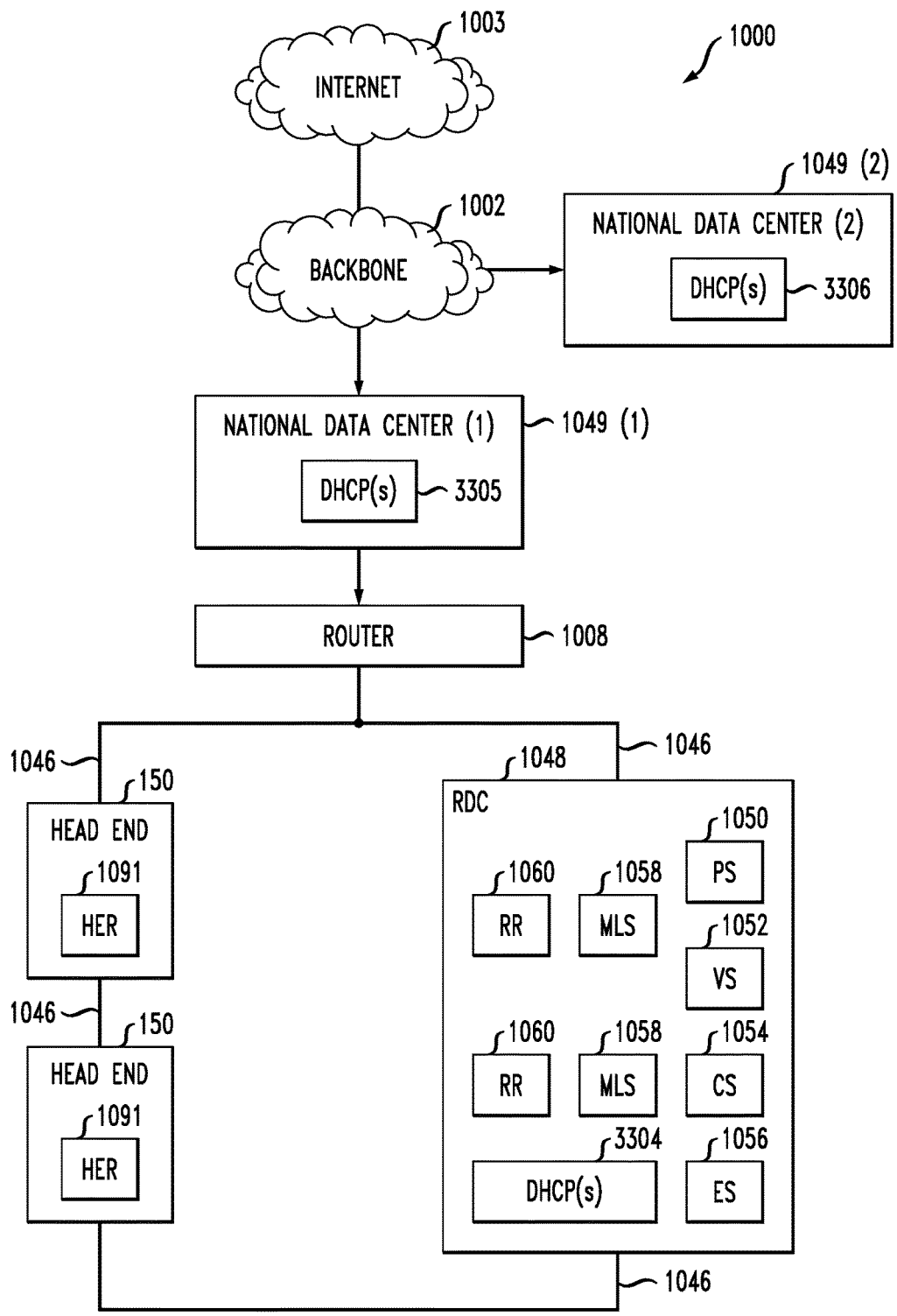
FIG. 1 is a block diagram of an exemplary embodiment of a system, within which one or more aspects of the invention can be implemented.

As noted, IP-based data services may be provided over a variety of networks. Purely by way of example and not limitation, embodiments will be shown in the context of a cable multi-service operator (MSO) providing data services as well as entertainment services. FIG. 1 shows an exemplary system 1000, according to an aspect of the invention. System 1000 includes a regional data center (RDC) 1048, and one or more divisions, represented by division head ends 150. RDC 1048 and head ends 150 are interconnected by a network 1046; by way of example and not limitation, a dense wavelength division multiplex (DWDM) network. Elements 1048, 150 on network 1046 may be operated, for example, by or on behalf of a cable MSO, and may be interconnected with a global system of interconnected computer networks that use the standardized Internet Protocol Suite (TCP/IP)(transfer control protocol/Internet protocol), commonly called the Internet 1003; for example, via router 1008, National Data Center(1) 1049(1), discussed further below, and backbone 1002. In one or more non-limiting exemplary embodiments, router 1008 is a point-of-presence ("POP") router; for example, of the kind available from Juniper Networks, Inc., Sunnyvale, Calif., USA.

Head ends 150 may each include a head end router (HER) 1091 which interfaces with network 1046. Head end routers 1091 are omitted from FIGS. 2-5 below to avoid clutter.

RDC 1048 may include one or more provisioning servers (PS) 1050, one or more Video Servers (VS) 1052, one or more content servers (CS) 1054, and one or more e-mail servers (ES) 1056. The same may be interconnected to one or more RDC routers (RR) 1060 by one or more multi-layer switches (MLS) 1058. RDC routers 1060 interconnect with network 1046.

Figure 2:
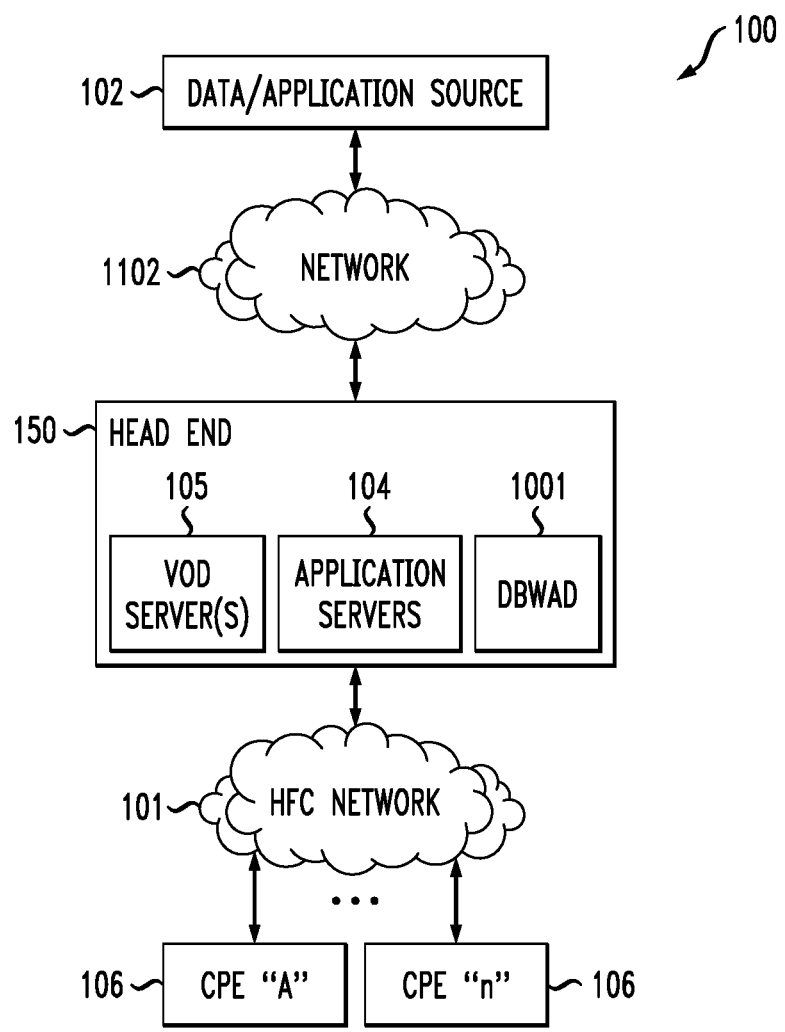
FIG. 2 is a functional block diagram illustrating an exemplary hybrid fiber-coaxial (HFC) divisional network configuration, useful within the system of FIG. 1.

FIG. 2 is a functional block diagram illustrating an exemplary content-based (e.g., hybrid fiber-coaxial (HFC)) divisional network configuration, useful within the system of FIG. 1. See, for example, US Patent Publication 2006/0130107 of Gonder et al., entitled "Method and apparatus for high bandwidth data transmission in content-based networks," the complete disclosure of which is expressly incorporated by reference herein in its entirety for all purposes. The various components of the network 100 include (i) one or more data and application origination points 102; (ii) one or more application distribution servers 104; (iii) one or more video-on-demand (VOD) servers 105, and (v) consumer premises equipment or customer premises equipment (CPE) 106. The distribution server(s) 104, VOD servers 105 and CPE(s) 106 are connected via a bearer (e.g., HFC) network 101. Servers 104, 105 can be located in head end 150. A simple architecture is shown in FIG. 2 for illustrative brevity, although it will be recognized that comparable architectures with multiple origination points, distribution servers, VOD servers, and/or CPE devices (as well as different network topologies) may be utilized consistent with embodiments of the invention. For example, the head-end architecture of FIG. 3 (described in greater detail below) may be used.

The data/application origination point 102 comprises any medium that allows data and/or applications (such as a VOD-based or "Watch TV" application) to be transferred to a distribution server 104, for example, over network 1102. This can include for example a third party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill, given the teachings herein. For example, in one or more embodiments, network 1102 may correspond to network 1046 of FIG. 1, and the data and application origination point may be, for example, within RDC 1048 or on the Internet 1003. Head end 150, HFC network 101, and CPEs 106 thus represent the divisions which were represented by division head ends 150 in FIG. 1.

The application distribution server 104 comprises a computer system where such applications can enter the network system. Distribution servers per se are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other appropriate locations) that can be accessed by a distribution server 104 or a cable modem termination system 156 (discussed below with regard to FIG. 3). Non-limiting examples of CPE are set-top boxes and high-speed cable modems for providing high bandwidth Internet access in premises such as homes and businesses.

Also included (for example, in head end 150) is a dynamic bandwidth allocation device (DBWAD) 1001 such as a global session resource manager, which is itself a non-limiting example of a session resource manager.

Figure 3:
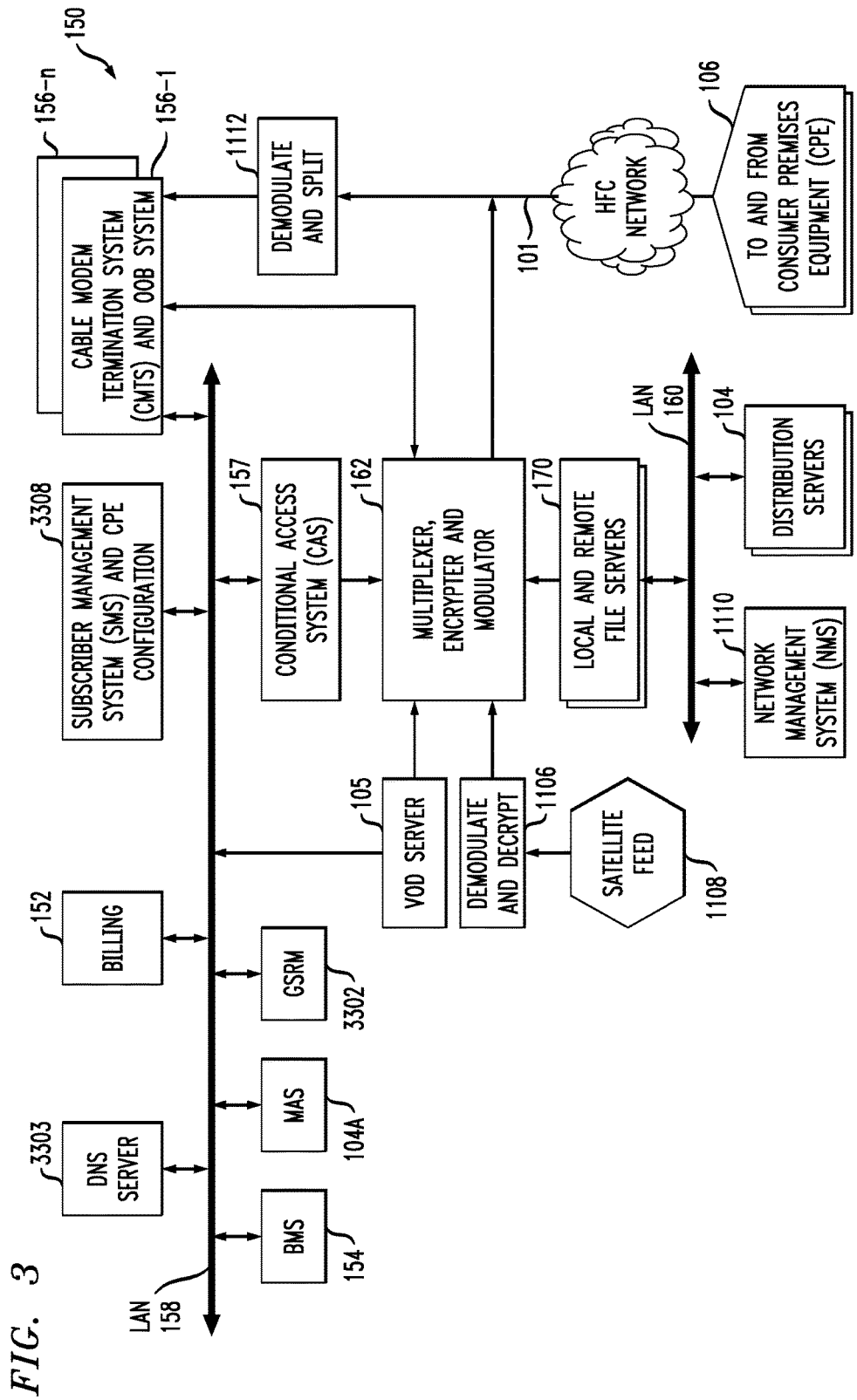
FIG. 3 is a functional block diagram illustrating one exemplary HFC cable network head-end configuration, useful within the system of FIG. 1.

FIG. 3 is a functional block diagram illustrating one exemplary HFC cable network head-end configuration, useful within the system of FIG. 1. As shown in FIG. 3, the head-end architecture 150 comprises typical head-end components and services including billing module 152, subscriber management system (SMS) and CPE configuration management module 3308, cable-modem termination system (CMTS) and out-of-band (OOB) system 156, as well as LAN(s) 158, 160 placing the various components in data communication with one another. In one or more embodiments, there are multiple CMTSs 156-1 through 156-n. Each may be coupled to an HER 1091, for example. See, e.g., FIGS. 1 and 2 of co-assigned U.S. Pat. No. 7,792,963 of inventors Gould and Danforth, entitled METHOD TO BLOCK UNAUTHORIZED NETWORK TRAFFIC IN A CABLE DATA NETWORK, the complete disclosure of which is expressly incorporated herein by reference in its entirety for all purposes.

It will be appreciated that while a bar or bus LAN topology is illustrated, any number of other arrangements (e.g., ring, star, etc.) may be used consistent with the invention. It will also be appreciated that the head-end configuration depicted in FIG. 3 is high-level, conceptual architecture and that each multi-service operator (MSO) may have multiple head-ends deployed using custom architectures.

The architecture 150 of FIG. 3 further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 158, although other architectures may be employed (such as for example where the VOD servers are associated with a core switching device such as an 802.3z Gigabit Ethernet device; or the VOD servers could be coupled to LAN 160). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (refer to description of FIG. 4) via a variety of interposed network components.

Content (e.g., audio, video, etc.) is provided in each downstream (in-band) channel associated with the relevant service group. (Note that in the context of data communications, internet data is passed both downstream and upstream.) To communicate with the head-end or intermediary node (e.g., hub server), the CPE 106 may use the out-of-band (OOB) or DOCSIS® (Data Over Cable Service Interface Specification) channels (registered mark of Cable Television Laboratories, Inc., 400 Centennial Parkway Louisville Colo. 80027, USA) and associated protocols (e.g., DOCSIS 1.x, 2.0. or 3.0). The OpenCable™ Application Platform (OCAP) 1.0, 2.0, 3.0 (and subsequent) specification (Cable Television laboratories Inc.) provides for exemplary networking protocols both downstream and upstream, although the invention is in no way limited to these approaches. All versions of the DOCSIS and OCAP specifications are expressly incorporated herein by reference in their entireties for all purposes.

Furthermore in this regard, DOCSIS is an international telecommunications standard that permits the addition of high-speed data transfer to an existing cable TV (CATV) system. It is employed by many cable television operators to provide Internet access (cable Internet) over their existing hybrid fiber-coaxial (HFC) infrastructure. Use of DOCSIS to transmit data on an HFC system is one non-limiting exemplary application of one or more embodiments. However, one or more embodiments are generally applicable to IP transport of data, regardless of what kind of network is employed.

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156.

Also included in FIG. 3 are a global session resource manager (GSRM) 3302, a Mystro Application Server 104A, and a business management system 154, all of which are coupled to LAN 158. GSRM 3302 is one specific form of a DBWAD 1001 and is a non-limiting example of a session resource manager.

An ISP DNS server could be located in the head-end as shown at 3303, but it can also be located in a variety of other places. One or more DHCP server(s) 3304, 3305, 3306, discussed further below, could also be located where shown or in different locations.

Figure 4:
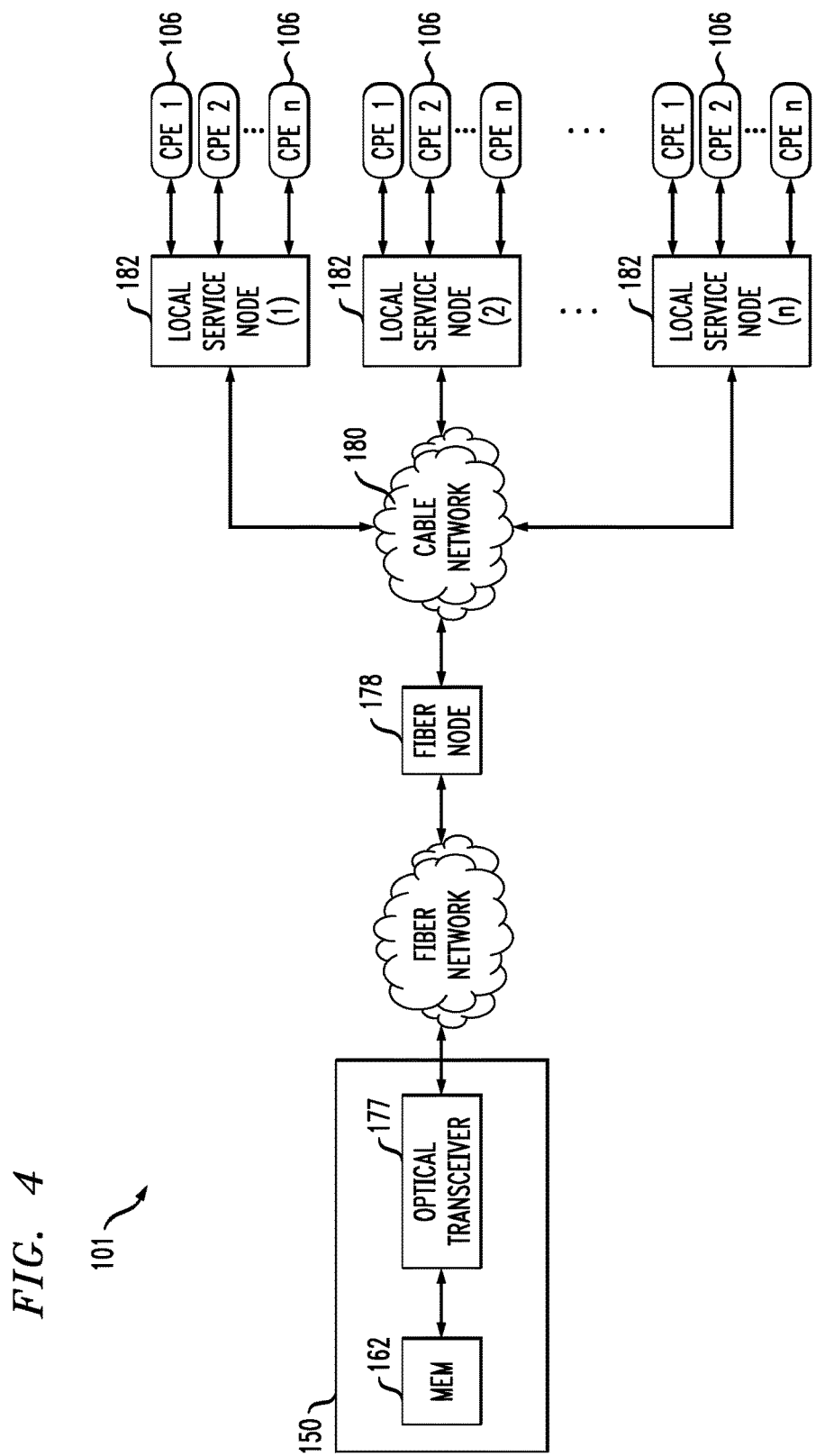
FIG. 4 is a functional block diagram illustrating one exemplary local service node configuration useful within the system of FIG. 1.

As shown in FIG. 4, the network 101 of FIGS. 2 and 3 comprises a fiber/coax arrangement wherein the output of the MEM 162 of FIG. 3 is transferred to the optical domain (such as via an optical transceiver 177 at the head-end 150 or further downstream). The optical domain signals are then distributed over a fiber network to a fiber node 178, which further distributes the signals over a distribution network 180 (typically coax) to a plurality of local servicing nodes 182. This provides an effective 1-to-N expansion of the network at the local service end. Each node 182 services a number of CPEs 106. Further reference may be had to US Patent Publication 2007/0217436 of Markley et al., entitled "Methods and apparatus for centralized content and data delivery," the complete disclosure of which is expressly incorporated herein by reference in its entirety for all purposes. In one or more embodiments, the CPE 106 includes a cable modem, such as a DOCSIS-compliant cable modem (DCCM).

Certain additional aspects of video or other content delivery will now be discussed for completeness, it being understood that embodiments of the invention have broad applicability to IP data communications and transport. Again, delivery of data over a video (or other) content network is but one non-limiting example of a context where one or more embodiments could be implemented. US Patent Publication 2003-0056217 of Paul D. Brooks, entitled "Technique for Effectively Providing Program Material in a Cable Television System," the complete disclosure of which is expressly incorporated herein by reference for all purposes, describes one exemplary broadcast switched digital architecture, although it will be recognized by those of ordinary skill that other approaches and architectures may be substituted. In a cable television system in accordance with the Brooks invention, program materials are made available to subscribers in a neighborhood on an as needed basis. Specifically, when a subscriber at a set-top terminal selects a program channel to watch, the selection request is transmitted to a head end of the system. In response to such a request, a controller in the head end determines whether the material of the selected program channel has been made available to the neighborhood. If it has been made available, the controller identifies to the set-top terminal the carrier which is carrying the requested program material, and to which the set-top terminal tunes to obtain the requested program material. Otherwise, the controller assigns an unused carrier to carry the requested program material, and informs the set-top terminal of the identity of the newly assigned carrier. The controller also retires those carriers assigned for the program channels which are no longer watched by the subscribers in the neighborhood. Note that reference is made herein, for brevity, to features of the "Brooks invention"—it should be understood that no inference should be drawn that such features are necessarily present in all claimed embodiments of Brooks. The Brooks invention is directed to a technique for utilizing limited network bandwidth to distribute program materials to subscribers in a community access television (CATV) system. In accordance with the Brooks invention, the CATV system makes available to subscribers selected program channels, as opposed to all of the program channels furnished by the system as in prior art. In the Brooks CATV system, the program channels are provided on an as needed basis, and are selected to serve the subscribers in the same neighborhood requesting those channels.

US Patent Publication 2010-0313236 of Albert Straub, entitled "TECHNIQUES FOR UPGRADING SOFTWARE IN A VIDEO CONTENT NETWORK," the complete disclosure of which is expressly incorporated herein by reference for all purposes, provides additional details on the aforementioned dynamic bandwidth allocation device 1001.

US Patent Publication 2009-0248794 of William L. Helms, entitled "SYSTEM AND METHOD FOR CONTENT SHARING," the complete disclosure of which is expressly incorporated herein by reference for all purposes, provides additional details on CPE in the form of a converged premises gateway device. Related aspects are also disclosed in US Patent Publication 2007-0217436 of Markley et al, entitled "METHODS AND APPARATUS FOR CENTRALIZED CONTENT AND DATA DELIVERY," the complete disclosure of which is expressly incorporated herein by reference for all purposes.

Figure 5:
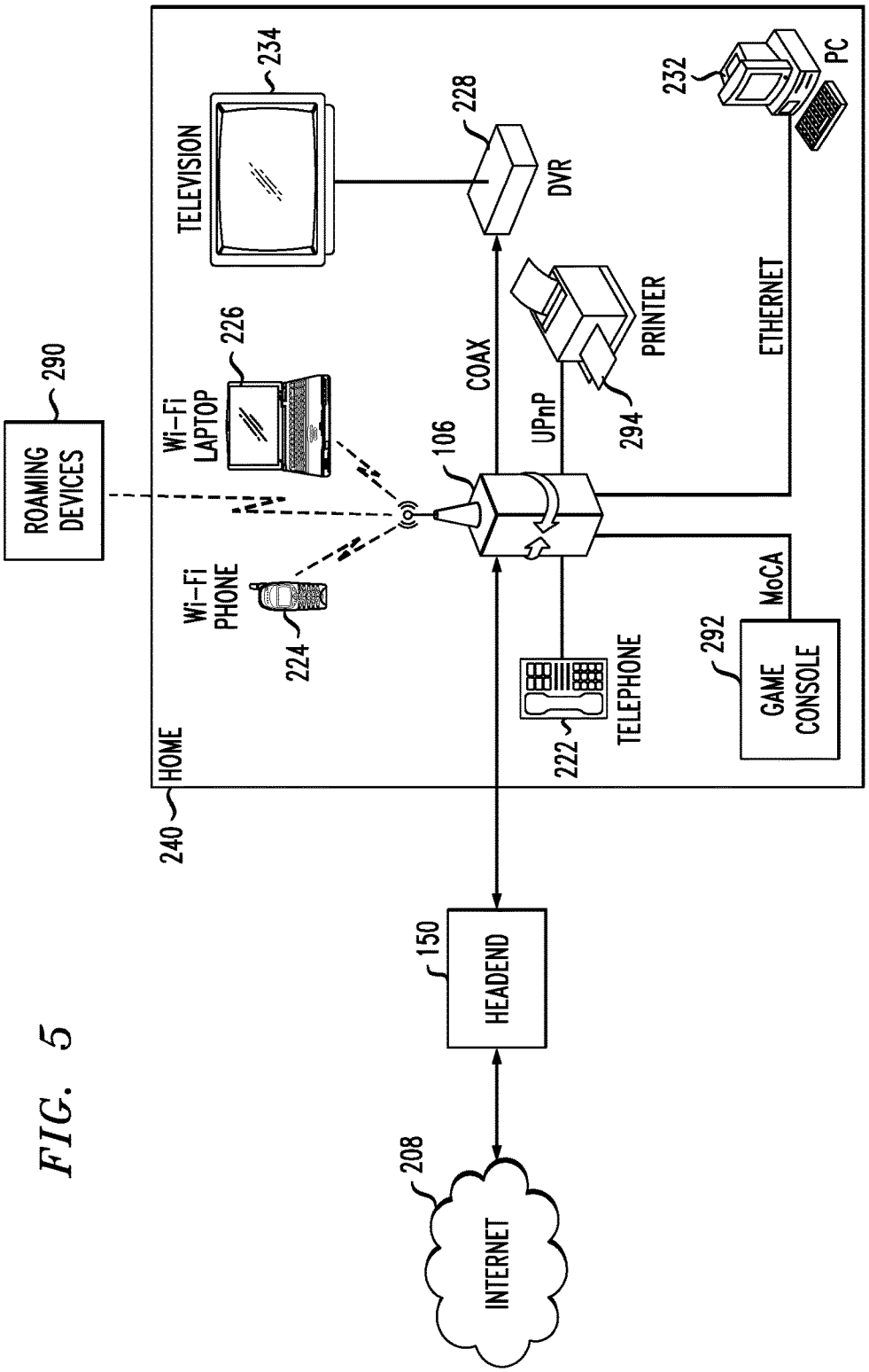
FIG. 5 is a functional block diagram of a premises network, including an exemplary centralized customer premises equipment (CPE) unit, interfacing with a head end such as that of FIG. 3.
Figure 6:
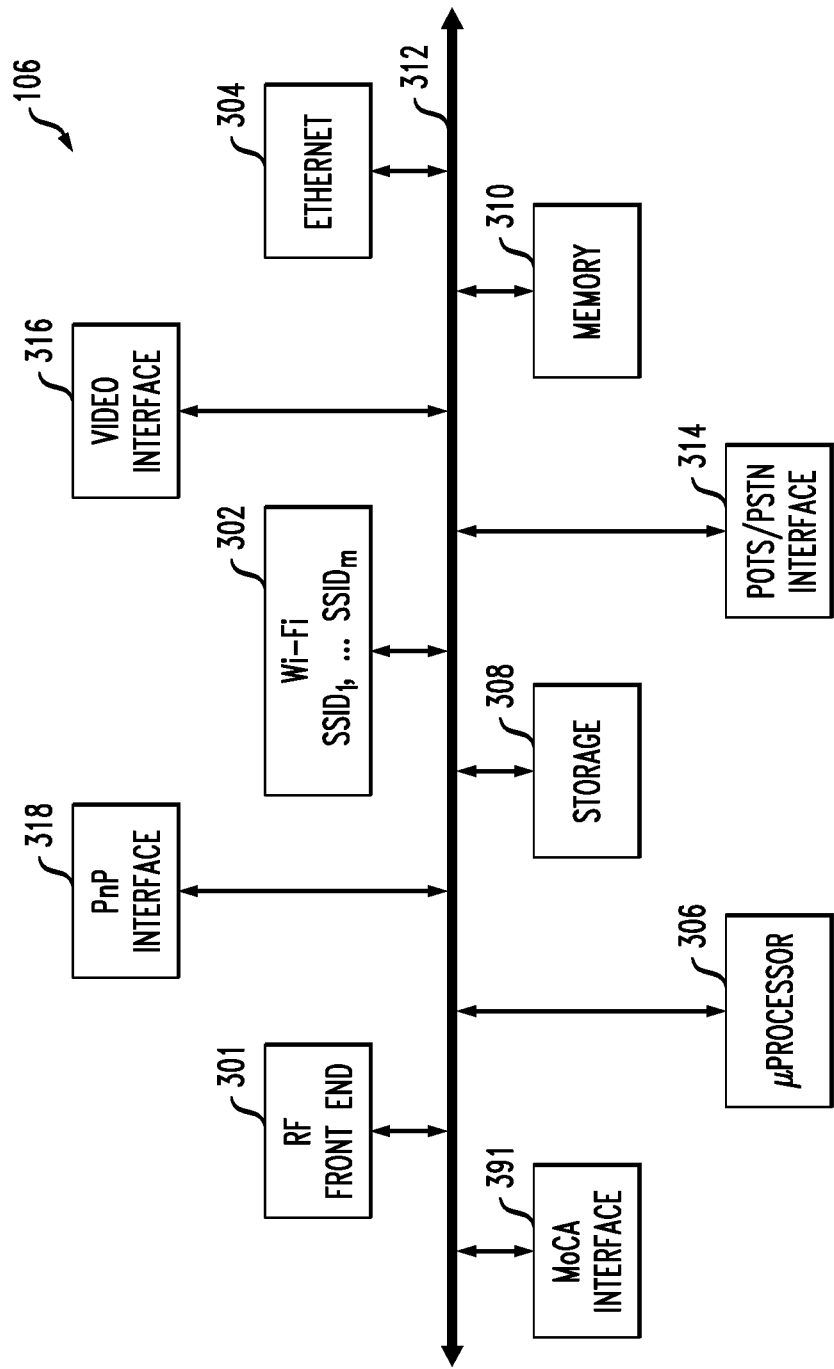
FIG. 6 is a functional block diagram of an exemplary centralized CPE unit, useful within the system of FIG. 1.

Reference should now be had to FIG. 5, which presents a block diagram of a premises network interfacing with a head end of an MSO or the like, providing Internet access. An exemplary advanced wireless gateway comprising CPE 106 is depicted as well. It is to be emphasized that the specific form of CPE 106 shown in FIGS. 5 and 6 is exemplary and non-limiting, and shows a number of optional features. Many other types of CPE can be employed in one or more embodiments; for example, any device 813, 815, 817, 819 as described below, such as a cable modem, DSL modem, and the like. Refer also to the discussion of a metropolitan Wi-Fi embodiment below.

CPE 106 includes an advanced wireless gateway which connects to a head end 150 or other hub of a network, such as a video content network of an MSO or the like. The head end is coupled also to an internet (e.g., the Internet) 208 which is located external to the head end 150, such as via an Internet (IP) backbone or gateway (not shown).

The head end is in the illustrated embodiment coupled to multiple households or other premises, including the exemplary illustrated household 240. In particular, the head end (for example, a cable modem termination system 156 thereof) is coupled via the aforementioned HFC network and local coaxial cable or fiber drop to the premises, including the consumer premises equipment (CPE) 106. The exemplary CPE 106 is in signal communication with any number of different devices including, e.g., a wired telephony unit 222, a Wi-Fi or other wireless-enabled phone 224, a Wi-Fi or other wireless-enabled laptop 226, a session initiation protocol (SIP) phone, an H.323 terminal or gateway, etc. Additionally, the CPE 106 is also coupled to a digital video recorder (DVR) 228 (e.g., over coax), in turn coupled to television 234 via a wired or wireless interface (e.g., cabling, PAN or 802.15 UWB micro-net, etc.). CPE 106 is also in communication with a network (here, an Ethernet network compliant with IEEE Std. 802.3, although any number of other network protocols and topologies could be used) on which is a personal computer (PC) 232.

Other non-limiting exemplary devices that CPE 106 may communicate with include a printer 294; for example over a universal plug and play (UPnP) interface, and/or a game console 292; for example, over a multimedia over coax alliance (MoCA) interface.

In some instances, CPE 106 is also in signal communication with one or more roaming devices, generally represented by block 290.

A "home LAN" (HLAN) is created in the exemplary embodiment, which may include for example the network formed over the installed coaxial cabling in the premises, the Wi-Fi network, and so forth.

During operation, the CPE 106 exchanges signals with the head end over the interposed coax (and/or other, e.g., fiber) bearer medium. The signals include e.g., Internet traffic (IPv4 or IPv6), digital programming and other digital signaling or content such as digital (packet-based; e.g., VoIP) telephone service. The CPE 106 then exchanges this digital information after demodulation and any decryption (and any demultiplexing) to the particular system(s) to which it is directed or addressed. For example, in one embodiment, a MAC address or IP address can be used as the basis of directing traffic within the client-side environment 240.

Any number of different data flows may occur within the network depicted in FIG. 5. For example, the CPE 106 may exchange digital telephone signals from the head end which are further exchanged with the telephone unit 222, the Wi-Fi phone 224, or one or more roaming devices 290. The digital telephone signals may be IP-based such as Voice-over-IP (VoIP), or may utilize another protocol or transport mechanism. The well known session initiation protocol (SIP) may be used, for example, in the context of a "SIP phone" for making multi-media calls. The network may also interface with a cellular or other wireless system, such as for example a 3G IMS (IP multimedia subsystem) system, in order to provide multimedia calls between a user or consumer in the household domain 240 (e.g., using a SIP phone or H.323 terminal) and a mobile 3G telephone or personal media device (PMD) user via that user's radio access network (RAN).

The CPE 106 may also exchange Internet traffic (e.g., TCP/IP and other packets) with the head end 150 which is further exchanged with the Wi-Fi laptop 226, the PC 232, one or more roaming devices 290, or other device. CPE 106 may also receive digital programming that is forwarded to the DVR 228 or to the television 234. Programming requests and other control information may be received by the CPE 106 and forwarded to the head end as well for appropriate handling.

FIG. 6 is a block diagram of one exemplary embodiment of the CPE 106 of FIG. 5. The exemplary CPE 106 includes an RF front end 301, Wi-Fi interface 302, video interface 316, "Plug n' Play" (PnP) interface 318 (for example, a UPnP interface) and Ethernet interface 304, each directly or indirectly coupled to a bus 312. In some cases, Wi-Fi interface 302 comprises a single wireless access point (WAP) running multiple ("m") service set identifiers (SSIDs). In some cases, multiple SSIDs, which could represent different applications, are served from a common WAP. For example, SSID 1 is for the home user, while SSID 2 may be for a managed security service, SSID 3 may be a managed home networking service, SSID 4 may be a hot spot, and so on. Each of these is on a separate IP subnetwork for security, accounting, and policy reasons. The microprocessor 306, storage unit 308, plain old telephone service (POTS)/public switched telephone network (PSTN) interface 314, and memory unit 310 are also coupled to the exemplary bus 312, as is a suitable MoCA interface 391. The memory unit 310 typically comprises a random access memory (RAM) and storage unit 308 typically comprises a hard disk drive, an optical drive (e.g., CD-ROM or DVD), NAND flash memory, RAID (redundant array of inexpensive disks) configuration, or some combination thereof.

The illustrated CPE 106 can assume literally any discrete form factor, including those adapted for desktop, floor-standing, or wall-mounted use, or alternatively may be integrated in whole or part (e.g., on a common functional basis) with other devices if desired.

Again, it is to be emphasized that every embodiment need not necessarily have all the elements shown in FIG. 6—as noted, the specific form of CPE 106 shown in FIGS. 5 and 6 is exemplary and non-limiting, and shows a number of optional features. Yet again, many other types of CPE can be employed in one or more embodiments; for example, any device 813, 815, 817, 819 as described below, such as a cable modem, DSL modem, and the like—refer also to the discussion of a metropolitan Wi-Fi embodiment below.

It will be recognized that while a linear or centralized bus architecture is shown as the basis of the exemplary embodiment of FIG. 6, other bus architectures and topologies may be used. For example, a distributed or multi-stage bus architecture may be employed. Similarly, a "fabric" or other mechanism (e.g., crossbar switch, RAPIDIO interface, non-blocking matrix, TDMA or multiplexed system, etc.) may be used as the basis of at least some of the internal bus communications within the device. Furthermore, many if not all of the foregoing functions may be integrated into one or more integrated circuit (IC) devices in the form of an ASIC or "system-on-a-chip" (SoC). Myriad other architectures well known to those in the data processing and computer arts may accordingly be employed.

Yet again, it will also be recognized that the CPE configuration shown is essentially for illustrative purposes, and various other configurations of the CPE 106 are consistent with other embodiments of the invention. For example, the CPE 106 in FIG. 6 may not include all of the elements shown, and/or may include additional elements and interfaces such as for example an interface for the HomePlug A/V standard which transmits digital data over power lines, a PAN (e.g., 802.15), Bluetooth, or other short-range wireless interface for localized data communication, etc.

A suitable number of standard 10/100/1000 Base T Ethernet ports for the purpose of a Home LAN connection are provided in the exemplary device of FIG. 6; however, it will be appreciated that other rates (e.g., Gigabit Ethernet or 10-Gig-E) and local networking protocols (e.g., MoCA, USB, etc.) may be used. These interfaces may be serviced via a WLAN interface, wired RJ-45 ports, or otherwise. The CPE 106 can also include a plurality of RJ-11 ports for telephony interface, as well as a plurality of USB (e.g., USB 2.0) ports, and IEEE-1394 (Firewire) ports. S-video and other signal interfaces may also be provided if desired.

During operation of the CPE 106, software located in the storage unit 308 is run on the microprocessor 306 using the memory unit 310 (e.g., a program memory within or external to the microprocessor). The software controls the operation of the other components of the system, and provides various other functions within the CPE. Other system software/firmware may also be externally reprogrammed, such as using a download and reprogramming of the contents of the flash memory, replacement of files on the storage device or within other non-volatile storage, etc. This allows for remote reprogramming or reconfiguration of the CPE 106 by the MSO or other network agent.

The RF front end 301 of the exemplary embodiment comprises a cable modem of the type known in the art. In some cases, the CPE just includes the cable modem and omits the optional features. Content or data normally streamed over the cable modem can be received and distributed by the CPE 106, such as for example packetized video (e.g., IPTV). The digital data exchanged using RF front end 301 includes IP or other packetized protocol traffic that provides access to internet service. As is well known in cable modem technology, such data may be streamed over one or more dedicated QAMs resident on the HFC bearer medium, or even multiplexed or otherwise combined with QAMs allocated for content delivery, etc. The packetized (e.g., IP) traffic received by the CPE 106 may then be exchanged with other digital systems in the local environment 240 (or outside this environment by way of a gateway or portal) via, e.g. the Wi-Fi interface 302, Ethernet interface 304 or plug-and-play (PnP) interface 318.

Additionally, the RF front end 301 modulates, encrypts/multiplexes as required, and transmits digital information for receipt by upstream entities such as the CMTS or a network server. Digital data transmitted via the RF front end 301 may include, for example, MPEG-2 encoded programming data that is forwarded to a television monitor via the video interface 316. Programming data may also be stored on the CPE storage unit 308 for later distribution by way of the video interface 316, or using the Wi-Fi interface 302, Ethernet interface 304, Firewire (IEEE Std 1394), USB/USB2, or any number of other such options.

Other devices such as portable music players (e.g., MP3 audio players) may be coupled to the CPE 106 via any number of different interfaces, and music and other media files downloaded for portable use and viewing.

In some instances, the CPE 106 includes a DOCSIS cable modem for delivery of traditional broadband Internet services. This connection can be shared by all Internet devices in the premises 240; e.g. Internet protocol television (IPTV) devices, PCs, laptops, etc., as well as by roaming devices 290. In addition, the CPE 106 can be remotely managed (such as from the head end 150, or another remote network agent) to support appropriate IP services.

In some instances the CPE 106 also creates a home Local Area Network (LAN) utilizing the existing coaxial cable in the home. For example, an Ethernet-over-coax based technology allows services to be delivered to other devices in the home utilizing a frequency outside (e.g., above) the traditional cable service delivery frequencies. For example, frequencies on the order of 1150 MHz could be used to deliver data and applications to other devices in the home such as PCs, PMDs, media extenders and set-top boxes. The coaxial network is merely the bearer; devices on the network utilize Ethernet or other comparable networking protocols over this bearer.

The exemplary CPE 106 shown in FIGS. 5 and 6 acts as a Wi-Fi access point (AP), thereby allowing Wi-Fi enabled devices to connect to the home network and access Internet, media, and other resources on the network. This functionality can be omitted in one or more embodiments.

In one embodiment, Wi-Fi interface 302 comprises a single wireless access point (WAP) running multiple ("m") service set identifiers (SSIDs). One or more SSIDs can be set aside for the home network while one or more SSIDs can be set aside for roaming devices 290.

A premises gateway software management package (application) is also provided to control, configure, monitor and provision the CPE 106 from the cable head-end 150 or other remote network node via the cable modem (DOCSIS) interface. This control allows a remote user to configure and monitor the CPE 106 and home network.

The MoCA interface 391 can be configured, for example, in accordance with the MoCA 1.0, 1.1, or 2.0 specifications.

As discussed above, the optional Wi-Fi wireless interface 302 is, in some instances, also configured to provide a plurality of unique service set identifiers (SSIDs) simultaneously. These SSIDs are configurable (locally or remotely), such as via a web page.

In addition to "broadcast" content (e.g., video programming), the systems of FIGS. 1-6 also deliver Internet data services using the Internet protocol (IP), although other protocols and transport mechanisms of the type well known in the digital communication art may be substituted. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

As noted, enterprise DHCP servers are commonly deployed in a cluster configuration where a pair of servers share responsibility for providing leases to a defined set of network infrastructure. In a cable network, a DHCP cluster is responsible for providing DHCP leases to clients configured on a set of CMTSs. Each CMTS is configured with the IP addresses of the two DHCP servers and the servers are configured with the IP address ranges available on the CMTS. A DHCP cluster serves multiple CMTSs, typically grouped by geographic area.

Some embodiments are useful in novel DHCP infrastructures where DHCP servers are moved to national data centers (NDCs). As seen in FIG. 1, DHCP servers can, in general, be located in many different places. Some current approaches locate the DHCP server(s) in a regional data center, as seen at 3304. On the other hand, some novel DHCP infrastructures, as just noted, move the DHCP server(s) to one or more national data centers. The non-limiting example of FIG. 1 shows a first NDC, national data center (1), designated as 1049(1), and a second NDC, national data center (2), designated as 1049(2). The NDCs 1049(1) and 1049(2) may, for example, be in geographically diverse locations such as, e.g., Colorado and North Carolina.

In such a case, one DHCP server from each pair is located in Colorado and the other will be located in North Carolina. Of course, some embodiments may utilize only a single NDC, or more than two NDCs, or may involve clusters of DHCP servers that are not associated with NDCs and/or MSOs.

Note that the NDCs 1049(1) and 1049(2) may be connected by a suitable enterprise backbone network 1002 such as, by way of example and not limitation, a private, high-bandwidth, Internet Protocol fiber optic network.

One or more embodiments are useful in a wide variety of contexts. Some embodiments are particularly useful when transitioning the location of DHCP servers from within one or more RDCs, as at 3304, to within one or more NDCs, as at 3305, 3306. One manner to facilitate such a transition involves a network operations team manually reconfiguring every CMTS (a modern MSO might have, for example, on the order of two thousand CMTSs) to point to the new DHCP server IP addresses as the DHCP servers move in to the NDCs. In such a case, the reconfiguration of the CMTS must typically be performed at the same time as the DHCP server work, in order to avoid a DHCP outage for subscribers. In some such cases, further DHCP server work (such as server consolidation) will be carried out after migrating to the national DHCP infrastructure, which will again typically require updating the CMTS configuration simultaneously with any DHCP work.

Such a "brute force" approach, orchestrating CMTS configuration updates simultaneously with back-end DHCP server work, potentially spanning different operations teams, may be challenging. One or more embodiments provide a system and/or method useful in such a scenario, although it should be noted that one or more embodiments are useful in many different scenarios and are not limited to migration of DHCP servers from regional to national data centers.

Note that when a DHCP message is relayed by a network device, the network device is referred to as a DHCP relay. In DHCP v.4, the client sends a DISCOVER packet, the server sends an OFFER, the client then responds with a REQUEST, and the server responds with an ACKnowledgement—DISCOVER, OFFER, REQUEST, AND ACK are thus examples of DHCP messages. The DHCP relay inserts some of its own identifying information in a DHCP request and forwards it on to its configured DHCP server IP addresses. In a typical network design, the DHCP relay forwards the DHCP message directly to the DHCP server responsible for allocating leases on its behalf. One or more embodiments introduce an intermediary DHCP relay 843, discussed in detail in connection with FIG. 8 below, between the DHCP relay (CMTS) and the DHCP server. This relay determines which back-end DHCP server is responsible for allocating leases for the CMTS. The relay examines the DHCP request to determine which CMTS it originated from (based on the GIADDR (Gateway IP Address) field in the DHCP request). The relay takes the CMTS IP address and looks it up against a map that provides a mapping of CMTS to back-end DHCP server IP address. After learning the back-end DHCP server IP address, the intermediary relay forwards the DHCP request to the correct back-end DHCP server.

With this approach, each CMTS in a network can be configured with a common pair of DHCP server IP addresses. The IP addresses point to the intermediary DHCP relays for each of the two NDCs (primary and secondary) (or to the corresponding load balancer(s) 909 if employed) which forward the DHCP request to the correct back-end server automatically. This allows a systems operations team or the like to collapse or combine DHCP server clusters at will without requiring changes on the CMTSs. It also simplifies the CMTS configuration because the DHCP server IP addresses are the same across the entire enterprise. The intermediary relay takes the responsibility of forwarding DHCP requests to the correct back-end DHCP server, instead of the CMTS having this responsibility.

In some cases, the intermediary relay 843 automatically accesses the configurations of the DHCP servers it fronts so that it can build its map 849 (discussed below) automatically. By knowing how each DHCP server is configured, the relay can build the CMTS-to-DHCP server map programmatically, thus eliminating the need for a human to keep the map up to date. Some embodiments collect the data approximately every minute or so; thus, the map reflects changes made to a back-end DHCP server in near real-time.

One or more embodiments work equally well with DHCPv4 and DHCPv6. The protocol level changes necessary to forward the relayed messages differ between DHCPv4 and DHCPv6; however, conceptually, the approach is the same. When using DHCPv4, responses from the DHCP server bypass the intermediary relay and are sent directly to the CMTS. With DHCPv6, requests and responses are both routed through the intermediary relay. This is due to differences in the protocols.

Some embodiments have any one, some, or all of the following additional features:

The intermediary relay routes incoming DHCP requests based upon additional criteria beyond the CMTS's IP address. Any information contained in the DHCP request can be used to choose an appropriate back-end server.

The intermediary relay modifies DHCP messages it is relaying, as necessary, to affect the behavior of the DHCP server. This is helpful in some cases; for example, where a CMTS sends some incorrect information in its forwarded DHCP packets, which causes current DHCP servers to reject packets that have been relayed twice. Various example applications include VPN features not supported by current CMTS software; it may be possible to modify the DHCP messages in the intermediary relay so that the DHCP server software "sees" all the information it expects when processing the request.

Can easily be used for non-cable based networks. DHCP relaying is an industry standard practice for access networks. Other examples of situations where DHCP is commonly relayed include Metro Wi-Fi, Mobile, and DSL networks. An exemplary relaying approach according to one or more embodiments can benefit other network operators outside the cable MSO domain by decoupling configuration of the access device and DHCP server.

Some embodiments include a system (see discussion of work assignment engine 854 elsewhere herein) that manages all the back-end DHCP servers (e.g., 807, 809, 810) and moves CMTS traffic among a set of servers based upon load. This system spreads CMTS traffic across all the back-end servers and moves and/or rebalances traffic dynamically without requiring changes on the CMTS. This is different than the traditional load balancing for the intermediate relay at 909, as discussed elsewhere herein.

Thus, one or more embodiments may be useful in a variety of products and/or services, such as, for example, DHCP relays and enterprise DHCP servers. Purely by way of example and not limitation, some embodiments are helpful when changing the back-end DHCP server configuration for a CMTS infrastructure. By standardizing the CMTS configuration, a system operations team is empowered to perform back-end DHCP server work independently without coordination with network operations or the like.

Advantageously, in one or more embodiments, the CMTS configuration will essentially never be wrong. In some current systems, a situation may develop where a CMTS has been configured with an incorrect DHCP server IP address. If one of the two IP addresses is wrong, the CMTS will still function because it is still "talking" to one server in the DHCP cluster. However, if the single working DHCP server becomes unreachable, the CMTS will be unable to communicate with the remaining (incorrectly configured) server.

One or more embodiments thus employ a DHCP relay in front of a farm of DHCP servers to distribute requests to the appropriate back-end server. In contrast, the current industry standard is a tight coupling (via configuration) between the access device (CMTS, router, etc.) and the back-end DHCP server.

Figure 7:
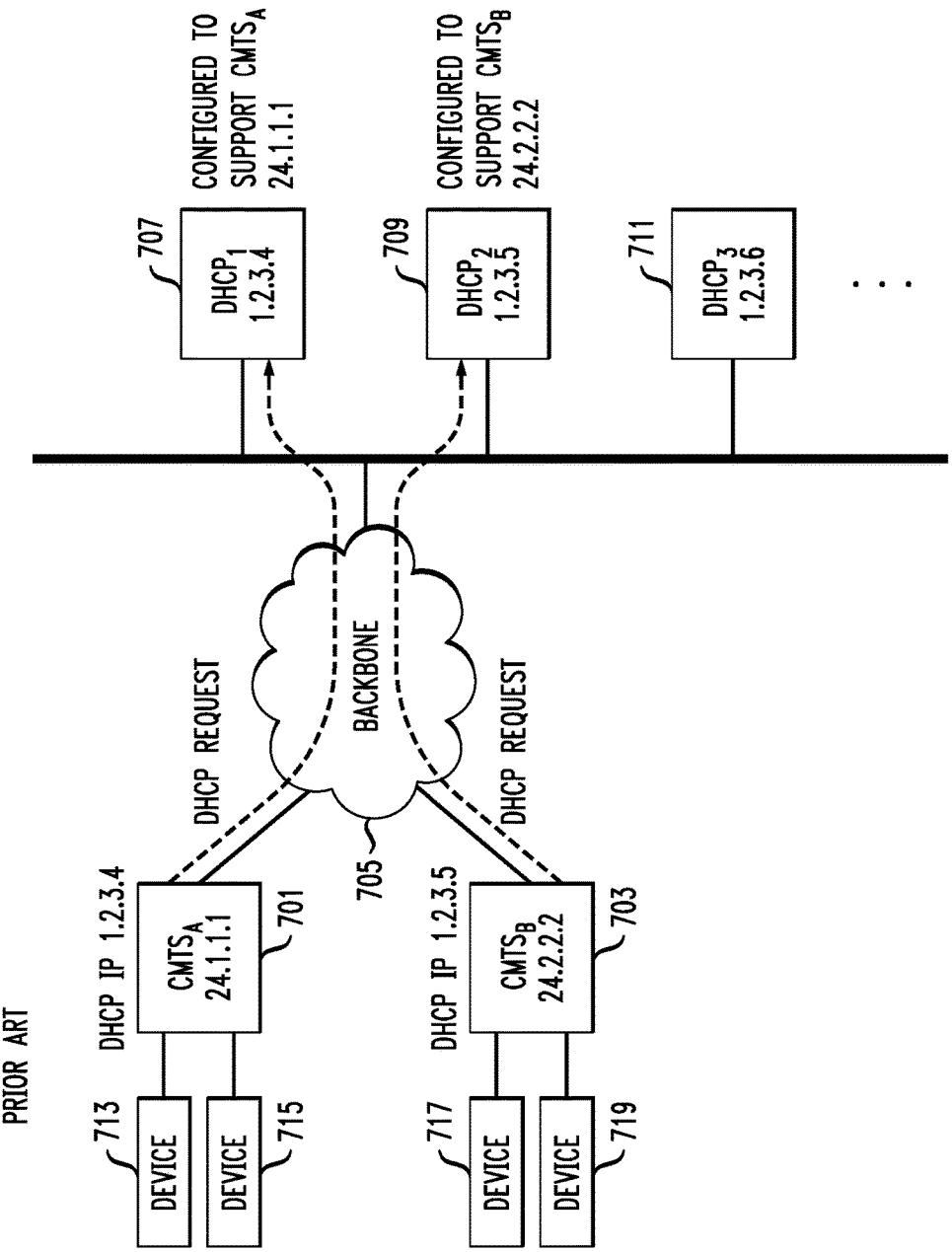
FIG. 7 is a block diagram of a prior art system.
Figure 8:
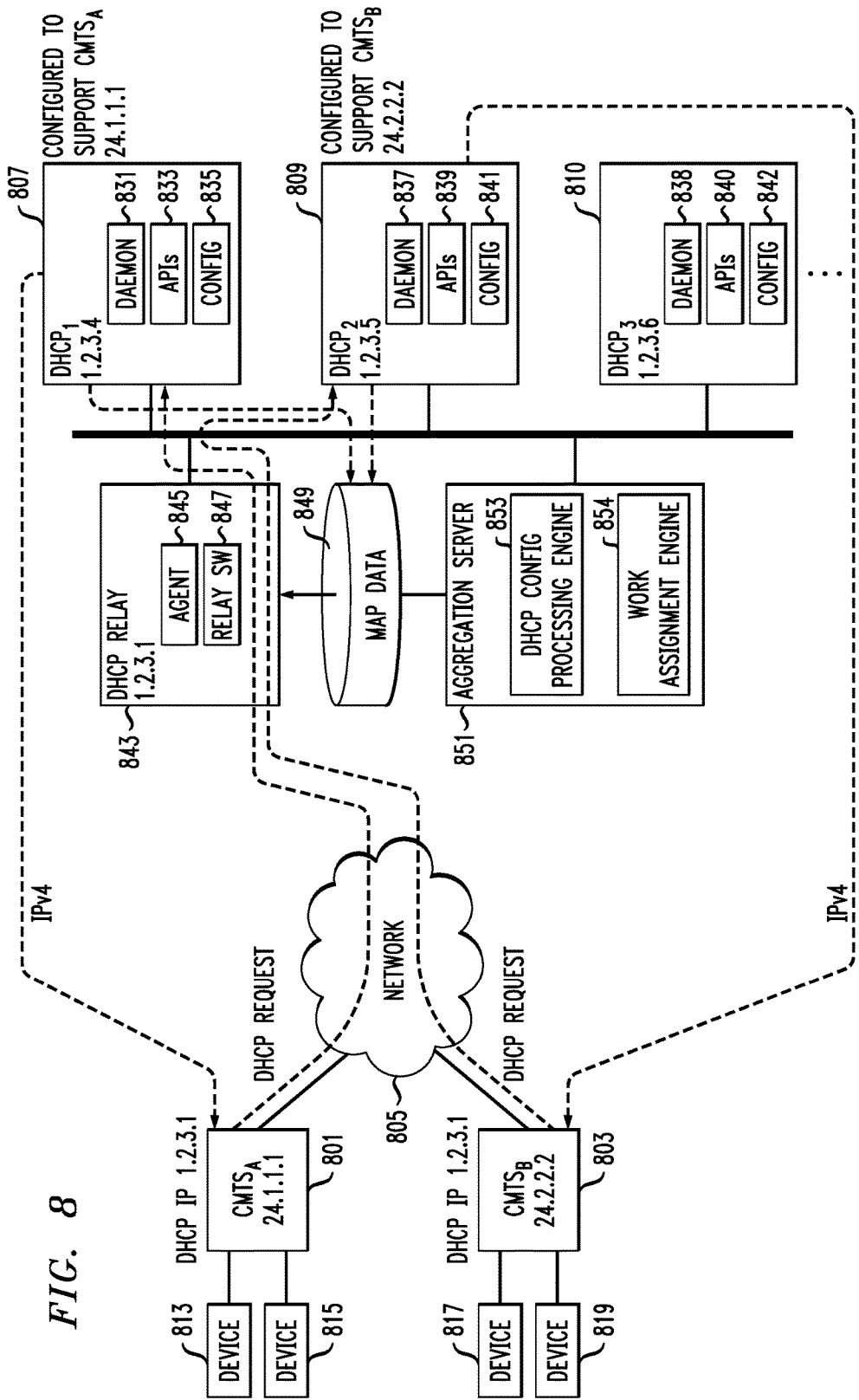
FIG. 8 is a block diagram of a system automatic routing of DHCP traffic, in accordance with an aspect of the invention.
Figure 9:
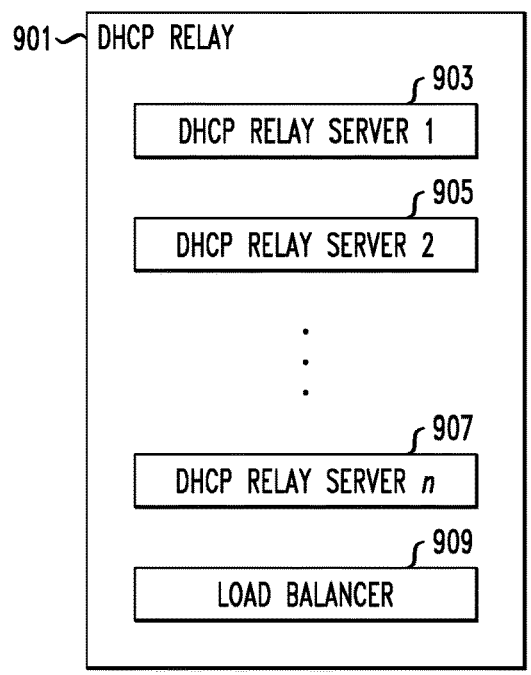
FIG. 9 is a block diagram of an exemplary DHCP relay, in accordance with an aspect of the invention.

A more detailed discussion will now be provided with reference to FIGS. 7-9. FIG. 7 shows a current system. There are a plurality of CMTSs 701, 703 on the network.

They perform a common DHCP function; they are fundamentally DHCP relay agents. DHCP is a protocol used on IP networks where client devices 713, 715, 717, 719 such as computers or cable modems can use DHCP to obtain an IP address to use on the network that they are connected to. DHCP itself is a broadcast protocol. When a computer is plugged into a network, it sends a broadcast message saying, in effect, "I need an IP address." That broadcast message does not leave the local network. The CMTS 701, 703 is responsible for listening for all the broadcast messages from IP devices 713, 715, 717, 719 connected to the CMTS and relaying these messages to the appropriate DHCP server 707, 709, 711; e.g., over backbone network 705. In one example of a current system, CMTSs 701, 703 are in one or more head ends 150; backbone 705 corresponds to network 1046, and DHCP servers 707, 709, 711 are located in a regional data center as seen at 3304 in FIG. 1. The dashed lines in FIG. 7 represent DHCP lease requests (and generally, DHCP messages) from $CMTS_A$ 701 to $DHCP_1$ 707 and from $CMTS_B$ to $DHCP_2$ 709.

The DHCP server is configured to match the configuration of the CMTS. The CMTS 701, 703 has a group of IP address blocks that it is configured to use for clients 713, 715, 717, 719. The DHCP server 707, 709, 711 has to have those same IP address blocks configured. The DHCP server 707, 709, 711 is responsible for selecting an IP address for the client 713, 715, 717, 719 which has sent that broadcast message which has in turn been relayed by the CMTS 701, 703. The DHCP server maintains all the states. The DHCP server keeps track of how many addresses have been allocated out of each block; it is responsible for finding an available address and keeping track of how long addresses have been granted and/or leased for, and so on.

In the exemplary current system of FIG. 7, $CMTS_A$, numbered 701, has IP address 24.1.1.1 and is configured with the IP address of DHCP server $DHCP_1$, numbered 707; namely 1.2.3.4. $DHCP_1$ is in turn configured to support $CMTS_A$ with IP address 24.1.1.1. $CMTS_B$, numbered 703, has IP address 24.2.2.2 and is configured with the IP address of DHCP server $DHCP_2$, numbered 709; namely 1.2.3.5. $DHCP_2$ is in turn configured to support $CMTS_B$ with IP address 24.2.2.2. Any suitable number of DHCP servers may be included; in the non-limiting example of FIG. 7, DHCP server $DHCP_3$, numbered 711, with IP address 1.2.3.6. Additional DHCP servers are suggested by an ellipsis.

When configuring a CMTS or other network device that is acting as a DHCP relay agent, the IP address(es) of the DHCP servers that are configured to support that network device must be provided. For example, on a CMTS from Cisco Systems, Inc. of San Jose, Calif., these are referred to as the "DHCP helper IP addresses." These addresses are configured on the CMTS and point to the DHCP servers that have been configured to support that CMTS. In the exemplary current system of FIG. 7, address 1.2.3.4 is configured on CMTSA and points to $DHCP_1$; while address 1.2.3.5 is configured on CMTSB and points to $DHCP_2$. Note that each CMTS 701, 703 might be provided with a back-up address pointing to a secondary DHCP but this is omitted from FIG. 7 to avoid clutter.

On an enterprise network with many CMTSs acting as relays, complication ensues. A modern network operated by an MSO may have about two thousand CMTSs and several hundred DHCP servers. When configuring CMTSs, it is necessary to ensure that the DHCP server address matches the server configured to support that CMTS. As noted above, some current systems employ a primary and secondary DHCP server configuration in a primary-secondary relationship. If one IP address is correct on the CMTS but the second is wrong, everything will operate normally until the primary DHCP server fails; if the address does not point to the correct secondary (backup) DHCP server, there will be an outage even though the backup DHCP server is actually available.

As noted above, the configurational complexity of current systems has led to operational challenges in keeping the addresses up to date. In a case where an MSO is centralizing its DHCP infrastructure, a "brute force" approach would likely result in having to change the helper addresses on every CMTS 701, 703.

Turning now to FIG. 8, in an exemplary embodiment, DHCP relay 843 is inserted as shown. DHCP relay 843 "speaks" the DHCP protocol and is inserted between the CMTSs 801, 803 and all the back-end DHCP servers 807, 809, 810. The responsibility of the relay 843 is to inspect the incoming DHCP lease requests or other DHCP messages that it receives from the CMTSs 801, 803; determine what CMTS 801, 803 the request originated from; and use a mapping database 849 to determine which DHCP server 807, 809, 810 supports that CMTS. From the perspective of the CMTS, there will only be two helper addresses, namely, the relay 843 in the primary data center (e.g., 1049(1)) and the relay in the backup data center (e.g., 1049(2)). The CMTSs will send traffic to the relays; the relays will look at the DHCP packet, note that it originated, for example, from "$CMTS_A$," and know that $CMTS_A$ is supported by DHCP server $DHCP_1$. DHCP server $DHCP_1$ handles the message normally without any special processing; it will merely have received the request and does not necessarily care that the relay 843 is in the middle of the conversation. DHCP server $DHCP_1$ simply handles the message normally and sends the response back to $CMTS_A$.

In some cases, the map data database 849 is configured by an operator. However, in one or more embodiments, the configuration data is extracted out of all the DHCP servers 807, 809, 810 (i.e., which DHCP server is responsible for which CMTS) and is aggregated in the mapping database 849 (e.g., by DHCP configuration processing engine 853 running on aggregation server 851). The mapping database 849 is then exposed to the relay 843. The relay 843 reads from the map database 849. Engine 853 running on server 851 automatically learns the DHCP servers serving each CMTS by periodically pulling the configurations 835, 841, 842 out of the DHCP servers 807, 809, 810 and updating the mapping database ("relay map") 849. Initial population of database 849 and periodic updates thereof are carried out in the same manner in one or more embodiments. In this regard, when engine 853 periodically pulls the configurations 835, 841, 842 it compares them to the contents of database 849. If nothing is in database 849, engine 853 populates database 849 with the contents of the config files. If there is data in database 849, engine 853 compares the config files to the data present in database 849, and updates same as needed. In one or more embodiments, in case of conflict, the oldest entry is used as described elsewhere herein. In some instances, the periodic checking by engine 853 is triggered by re-loading of the DHCP server software. In an alternative embodiment, engine 853 could simply re-write the data in database 849 upon such a re-load, without comparison and conflict checking.

As noted above, some embodiments have any one, some, or all of the following optional features. DHCP packets include various kinds of information; for example:
- IP address of the CMTS,
- type of device 813, 815, 817, 819 (e.g., a WINDOWS PC, DOCSIS cable modem, PacketCable Multimedia terminal adapter (MTA); DOCSIS cable modems include the make and model of the device),
- what version of DOCSIS the device 813, 815, 817, 819 supports (DOCSIS cable modems typically include this information),
- for a cable modem, e.g., the make and model and what software version is running.

Therefore, the relay 843 could select the destination based on more than just the source of the lease request or other DHCP message (i.e., which CMTS the lease request or other DHCP message originated from). Instead, the relay could, for example, send all DOCSIS 3.0 lease requests or other DHCP messages to a certain DHCP server, in a different group than other DHCP servers.

Thus, the relay 843 can use any information in the DHCP request packet to choose a back-end DHCP server; this decision need not be based in whole or part on the identity of the originating CMTS. That is to say, the decision could be based solely on the identity of the originating CMTS; on the identity of the originating CMTS and other information in the DHCP request, or on other information in the DHCP request without regard to the identity of the originating CMTS.

In some cases, the relay 843 re-writes the DHCP packets. For example, suppose a CMTS sends out an incorrect value for one of the options. When the relay forwards the packet to the DHCP server, the DHCP server is "unhappy" because the information in the packet does not match. To address this scenario, in some instances, the relay rewrites that particular option in the DHCP request to make the DHCP server accept the request. Thus, in some embodiments, the relay has the capability to rewrite or "fix" DHCP options within the DHCP message to "please" the DHCP server, or to address any peculiar implementations on the client or the relay agent (which is the CMTS).

In one or more embodiments, relay 843 is used for both DHCP v.4 and DHCP v.6. This is useful in a variety of contexts; especially in the aforementioned case when an MSO relocates DHCP servers to one or more national data centers. Such activities may take place while a transition to IPv6/DHCP v.6 is underway. When employing a relay 843 in accordance with one or more aspects of the invention in such cases, making the relay functional with both DHCP v.4 and DHCP v.6 essentially eliminates the need to carry out any configuration on CMTSs again. Advantageously, once a solution in accordance with one or more embodiments is deployed, an operations team is free to move CMTSs between DHCP servers at leisure, without having to actually touch the CMTSs.

Note that FIG. 8 only shows three DHCP servers 807, 809, and 810; however, more are suggested by the ellipsis. Suppose there are on the order of one hundred DHCP servers behind the relay 843 and they are all comparatively idle (i.e., underutilized). An operations team can collapse the one hundred servers into fifty servers, for example. A DHCP server that before had ten CMTSs on it now has twenty. Assume, for example, that all necessary work is done to orchestrate moving the CMTS configuration from the old DHCP server to the new one, and to move all of the DHCP lease information, and so on. If all of this is accomplished during the maintenance window and the DHCP server is correctly configured, the CMTS does not need to change or even be aware that the work has taken place and that one hundred DHCP servers have been replaced by fifty DHCP servers, since the CMTS talks only to DHCP relay 843. This aspect provides an operations team with greater flexibility for, e.g., load balancing and other operational requirements, without the need to coordinate with a regional network engineer who would otherwise have to log into each of the CMTSs that are being impacted at the exact time the DHCP change is being made and reconfigure each of the CMTSs. One or more embodiments advantageously simplify the operational aspect of DHCP management because they decouple the DHCP server topology from the CMTS.

As noted, in some embodiments, map data 849 is extracted from the DHCP servers. In one or more embodiments, there is a software component (daemon) 831, 837, 838 running on each of the DHCP servers, which daemon detects that the DHCP server has been reloaded. An individual DHCP server has to be reloaded to apply any configuration changes. The daemon 831, 837, 838 runs on each DHCP server and detects when the DHCP server has been reloaded, which generally implies a configuration change. Whenever the DHCP server has been reloaded, its configuration is extracted by daemon 831, 837, 838 using one or more APIs 833, 839, 840 provided by the vendor. The daemon 831, 837, 838 obtains the configuration file 835, 841, 842 and transfers it up to aggregation server 851 which collects all the configurations for all the DHCP servers in a particular location. The aggregation server processes all the configuration files 835, 841, 842 and builds the aggregate map data 849.

Aggregation server 851 may or may not be on the same physical server as DHCP relay 843. Aggregation server 851 takes DHCP configurations 835, 841, 842; identifies the network blocks/IP blocks, and builds the map 849.

Consider a case where DHCP server $DHCP_1$ and DHCP server $DHCP_2$ have configurations that conflict. For example, suppose they are both configured to serve the same network ranges for the same CMTS. In some embodiments, in case of duplicates, relay 843 uses the oldest match first. Aggregation server 851, when it extracts the information, applies marking or time stamping, i.e., "this is the first time I have seen this IP block on this DHCP server." If, later on, another DHCP server comes up and states that it is also responsible for that block, one or more embodiments default to the original server that the given address space was seen on, and send an exception to flag for human intervention to resolve the discrepancy. One or more embodiments default to the older DHCP server because that is the one most likely to have been working at one point. In general, DHCP servers may be managed by different groups of people. One or more embodiments seek to provide a safeguard such that if one person types in the wrong information, it will not break DHCP connectivity for some other region or CMTS. Therefore, one or more embodiments adopt the approach of defaulting to using the oldest information in case of a conflict.

Thus, in one or more embodiments, a daemon 831, 837, 838 on each DHCP server 807, 809, 810 uploads changes to aggregation server 851.

Note that DHCP relay 843 is shown as a single relay device in FIG. 8. Some embodiments take a simple approach and employ only a single relay device for each group of DHCP servers. However, in some instances, as seen in FIG. 9, a more sophisticated approach is provided, wherein there are several relay servers behind a load balancer (different physical servers or different virtual servers running on one or more physical machines). As seen in FIG. 9, a more sophisticated form of DHCP relay 901 includes DHCP relay servers 1 to n, numbered 903, 905, 907, with load balancer 909 to balance the load among the servers. It should be noted that the skilled artisan, given FIGS. 8-9, accompanying text, and other teachings herein, will be able to balance the DHCP relay load among multiple instances of the DHCP relay.

In FIG. 8, $CMTS_A$ has IP address 24.1.1.1, and $CMTS_B$ has IP address 24.2.2.2. DHCP relay 843 has IP address1.2.3.1. Referring bask to FIG. 7, in the current approach depicted therein, over each CMTS is the "helper" IP address, i.e., 1.2.3.4 for $CMTS_A$ and 1.2.3.5 for $CMTS_B$ (in each case, the actual IP address of the DHCP server 707, 709). In the exemplary embodiment of FIG. 8, each CMTS 801, 803 has the helper address equal to the relay IP address, namely, 1.2.3.1. $DHCP_1$ 807 with address 1.2.3.4 supports $CMTS_A$ 801. $DHCP_2$ 809 with address 1.2.3.5 supports $CMTS_B$ 803. Relay 843 relays lease requests or other DHCP messages to the appropriate DHCP server. Advantageously, in a modern network operated by an MSO, where there may be on the order of two thousand CMTSs, each CMTS will point to the same two IP addresses because of the two national data centers (i.e., each CMTS points to the IP address of the relay 843 (or load balancer if used) in one of the two NDCs and to the IP address of the relay 843 (or load balancer if used) in the other of the two NDCs). In one or more embodiments, the CMTSs do not have a concept of primary and secondary or back-up as regards the servers; the servers themselves determine which is primary or secondary or back-up. For example, in FIG. 8, $CMTS_A$ has the address of the relay 1.2.3.1 as one helper address, and the address of the relay in another national data center as the other helper address; the relays and/or servers in the national data centers are programmed to determine which is primary and which is secondary or back-up. In some cases, the primary site is chosen based on physical proximity to the CMTSs it supports. In other embodiments, one data center is entirely primary and another is entirely secondary or back-up.

As noted, one or more embodiments are useful in a variety of contexts besides a cable network. However, in the non-limiting example of FIG. 8, the CMTSs 801, 803 can be located in head ends 150 and the DHCP servers are located in one or more national data centers 1049. This centralization of the DHCP servers facilitates the use of the relay, which is located in the national data center(s) 1049, logically in front of the DHCP servers 807, 809, 810. Some DHCP products employ an active DHCP server and a standby DHCP server. In some embodiments, the active DHCP server is in one NDC and the standby DHCP server is in a different NDC. There is a relay 843 in front of each group of DHCP servers. The two helper addresses that point to the relay cover the active and back-up data centers.

In FIG. 8, the dashed lines labeled "DHCP Request" represent DHCP lease requests or other DHCP messages from $CMTS_A$ 801 to $DHCP_1$ 807 and from $CMTS_B$ 803 to $DHCP_2$ 809; in each case, the request is directed to Relay 843 which routes it in accordance with the map data 849. The dashed lines from the servers 807, 809 to the map data database 849 represent the population and updating of the map data database 849 as described in connection with the daemons, APIs, config files, aggregation server 851, and engine 853. Any suitable configuration can be employed for network 805; in some cases, the interconnections shown in FIG. 1 can be employed.

In some instances, aggregation server 851 also includes work assignment engine 854. Engine 854 re-distributes CMTS-es from one DHCP server (e.g., 807) to another (e.g., 809). Engine 854 includes logic to re-distribute the CMTS-es across the population of DHCP servers 807, 809, 810. In one or more embodiments, engine 854 will run periodically rather than continuously; for example, nightly. Engine 854, when making a change, moves all the configuration information (e.g., from 835 to 841) for the CMTS(es) that are being moved. Engine 854 also migrates the corresponding DHCP lease information. Servers 807, 809, 810 keep track of what addresses they have allocated, in a lease database—this is also carried over when making a change. By way of an example, suppose servers 807 and 809 each initially had twenty assigned CMTS-es. Suppose server 809 ended up being assigned to only ten CMTS-es due to changes in the network. Engine 854 could re-assign five CMTS-es from server 807 to server 809, so each would have fifteen.

Again, as noted, one or more embodiments are not limited to cable network applications. One non-limiting example of an alternative application is in a metropolitan Wi-Fi network. A metropolitan or municipal wireless network is the concept of turning an entire city into a Wireless Access Zone, with the ultimate goal of making wireless access to the Internet a universal service. This is usually done by providing municipal broadband via Wi-Fi to large parts or all of a municipal area by deploying a wireless mesh network. The typical deployment design uses hundreds of routers deployed outdoors, often on utility poles. The operator of the network acts as a wireless internet service provider.

For example, consider a situation where Wi-Fi access is provided at a plurality of access points all around a metropolitan area. The network devices that aggregate the network traffic from the Wi-Fi access points behave in a similar manner to the CMTSs described in FIG. 8. They "see" the broadcast DHCP messages, and they are configured with a helper address. They forward the DHCP lease request messages or other DHCP messages on to a DHCP server that knows how to handle them. Thus, the concept of a DHCP relay 843 with a mapping database 849 can be used in connection with any sort of network device that needs to be configured with a DHCP helper. The relay is placed between the DHCP servers and the network device to mask the DHCP server topology. Thus, one or more embodiments aggregate the DHCP servers using the relay for any kind of network architecture where there is a DHCP relay agent relaying DHCP messages.

As noted, one or more embodiments provide a relay device 843 functional with both IPv4 and IPv6. In DHCP v.4, the relay 843 receives the request and forwards it directly on to the DHCP server 807, 809, or 810. The DHCP server responds directly to the CMTS; the relay does not have to route the response. See the dotted lines in FIG. 8 labeled "IPv4"—in IPv6, the responses follow the reverse path back through the relay. The response comes directly back from the DHCP server to the CMTS. In some cases, the relay 843 may have to re-write one of the options to get the DHCP server to accept the relayed message.

In DHCP v.6, per the protocol, relay messages and relay responses both go through the relay 843. Therefore, in DHCP v.6, the lease request will "hit" the relay 843. The relay 843 will encapsulate the lease request in another form. There is, in DHCP v.6, a specific message type to make it clear to all the systems online how many times a message has been relayed. In DHCP v.6, the broadcast (more correctly, multicast in DHCP v.6) message is received by the CMTS; the CMTS wraps a so-called relay forward header onto the multicast message and forwards the multicast message on. The relay 843 receives the forwarded message, wraps another relay forward header on the forwarded message, and relays the message to the back-end DHCP server 807, 809, 810. The back-end DHCP server processes the lease, makes all the decisions normally, and then responds to the relay with a relay reply. The relay 843 strips off the header that it added and passes the message back to the CMTS. The CMTS strips off the header that it added and passes the message back to the connected client 813, 815, 817, or 819. Thus, DHCP v.6 differs from DHCP v.4 in that there are specific messages in the protocol and the relay routes both the requests and the responses.

As used herein, dynamic host configuration protocol (DHCP) without a qualifier is defined to include DHCP v.4 and DHCP v.6. DHCP v.4 is defined in accordance with Internet Engineering Task Force (IETF) RFC 2131, incorporated herein by reference in its entirety for all purposes, and DHCP v.6 is defined in accordance with IETF RFC 3315, incorporated herein by reference in its entirety for all purposes.

The skilled artisan will appreciate that, in DHCPv4:

With respect to a DHCPDISCOVER packet: the client sends a DHCPDISCOVER packet. In the IP section, the Destination address is 255.255.255.255 (broadcast) and the Source address is 0.0.0.0. The DHCP section identifies the packet as a Discover packet and identifies the client in two places using the physical address of the network card. The values in the CHADDR field and the DHCP: Client Identifier field are identical.

The broadcast DHCPDISCOVER packet is received by a Relay Agent responsible for forwarding DHCP on the local network segment. The Relay Agent inserts its IP address for the logical interface on which it received the DHCPDISCOVER in the GIADDR field of the DHCP header. The Relay Agent then forwards the packet using unicast to the configured DHCP servers (known as DHCP helpers). With respect to a DHCPOFFER packet: the DHCP server responds by sending a DHCPOFFER packet. In the IP section, the Source address is now the DHCP server IP address, and the Destination address is the broadcast address 255.255.255.255. The DHCP section identifies the packet as an Offer. The YIADDR field is populated with the IP address the server is offering the client. The CHADDR field still contains the physical address of the requesting client. In the DHCP Option Field section, various options are sent by the server along with the IP address; e.g., the Subnet Mask, Default Gateway (Router), Lease Time, and Domain Name Servers.

The DHCP server sends the DHCPOFFER using unicast to the IP address contained within the GIADDR field of the DHCPDISCOVER. The DHCP Relay receives the packet and uses the GIADDR field to determine on which directly connected interface to broadcast the response. With respect to a DHCPREQUEST packet: the client responds to the DHCPOFFER by sending a DHCPREQUEST. In the IP section, the Source address of the client is still 0.0.0.0 and the Destination for the packet is still 255.255.255.255. The client retains 0.0.0.0 because the client hasn't received verification from the server that it is acceptable to start using the address offered. The Destination is still broadcast, because more than one DHCP server may have responded and may be holding a reservation for an Offer made to the client. This lets those other DHCP servers know they can release their offered addresses and return them to their available pools. The DHCP section identifies the packet as a Request and verifies the offered address using the DHCP: Requested Address field. The DHCP: Server Identifier field shows the IP address of the DHCP server offering the lease.

The broadcast DHCPREQUEST packet is received by a Relay Agent responsible for forwarding DHCP on the local network segment. The Relay Agent inserts its IP address for the logical interface on which it received the DHCPREQUEST in the GIADDR field of the DHCP header. The Relay Agent then forwards the packet using unicast to the configured DHCP servers (known as DHCP helpers). With respect to a DHCPACK packet: the DHCP server responds to the DHCPREQUEST with a DHCPACK, thus completing the initialization cycle. The Source address is the DHCP server IP address, and the Destination address is still 255.255.255.255. The YIADDR field contains the client's address, and the CHADDR and DHCP: Client Identifier fields are the physical address of the network card in the requesting client. The DHCP Option section identifies the packet as an ACK.

The DHCP server sends the DHCPACK using unicast to the IP address contained within the GIADDR field of the DHCPREQUEST. The DHCP Relay receives the packet and uses the GIADDR field to determine on which directly connected interface to broadcast the response.

The skilled artisan will appreciate that, in DHCPv6:
a SOLICIT message is sent by a client to locate servers;
an ADVERTISE message is sent by a server in response to a SOLICIT message to indicate availability;
a REQUEST message is sent by a client to request addresses or configuration settings from a server;
a REPLY message is sent by a server to a client in response to a SOLICIT, REQUEST, RENEW, REBIND, INFORMATION-REQUEST, CONFIRM, RELEASE, or DECLINE message; and
a RECONFIGURE message is sent by a server to a client to indicate that the server has new or updated configuration settings.

A RELAY-FORW message is sent by a Relay Agent to relay messages to other servers. The message being relayed is encapsulated within a Relay Message option.

A RELAY-REPL message is sent by a server containing a response message that a Relay Agent forwards to a client. The response message is encapsulated within a Relay Message option.

An exemplary software architecture will now be discussed. One or more embodiments include a daemon 831, 837, 838 on each DHCP server 807, 809, 810. One or more embodiments also include map data database 849 with aggregation server 851, wherein a DHCP configuration processing engine 853 runs on the aggregation server 851. When one of the DHCP servers 807, 809, 810 uploads a new configuration, this engine awakes; it parses the configuration; it extracts all the pertinent data; and it compares this pertinent data against the data currently stored in the database 849 to determine whether any address blocks have been added or removed, or if there are any duplicates.

The DHCP Relay 843 includes the actual relay software 847 as well as an agent 845 that periodically queries the map database 849. Note that the terms "agent" and "daemon" are more-or-less synonymous but to avoid confusion, the pieces of software on the DHCP servers 807, 809, 810 are referred to as daemons 831, 837, 838, while the piece of software on the DHCP relay 843 is referred to as agent 845. In one or more embodiments, rather than carrying out individual lookups against the map database, the whole database 849 is pushed onto the relay(s) 843 so that it is present locally. Agent 845 on the DHCP relay 843 synchronizes the map data by downloading updated maps. The map data from database 849 is periodically persisted in a file on server 843 and the relay software 847 periodically checks (e.g., once per second) for any changes in such file; the relay software 847 itself reloads the map data into memory automatically if it notices that the map has changed. By way of clarification, in one or more embodiments, the map is memory resident for speed; i.e., it is loaded into RAM on the machine(s) on which the relay(s) 843 execute.

In one or more embodiments, the relay instances 903, 905, 907 all act independently as no state information needs to be shared.

Again, as noted and as depicted in FIG. 9, one or more embodiments include a load balancer 909 in front of n relay servers 903, 905, 907.

In one or more embodiments, relays 843 are stateless because they do not need to keep any state. All information necessary to route responses is present in the headers. More particularly, since DHCP v.4 responses do not need to be routed back through relay 843, there is no state. However, with regard to the DHCP v.6 messages that are going back and forth, they have enough information in the (relay forward) headers that the relays are stateless. The servers do not need to keep each other apprised of what they are doing—they all act independently—effectively providing a "clean" solution.

Thus, in one or more embodiments, map data is persisted in the map database 849 on, or accessible to, the aggregation server 851. The agent 845 on the relay 843 uploads the data when there is a change, or periodically checks it and uploads it, as discussed above. All the data is preferably maintained in RAM for speed. The DHCP relay thus includes software 847 that is kept loaded in RAM, and all the map data 849 is also periodically updated and also kept loaded in RAM on whatever physical server the DHCP relay runs on, for speed.

Figure 11:
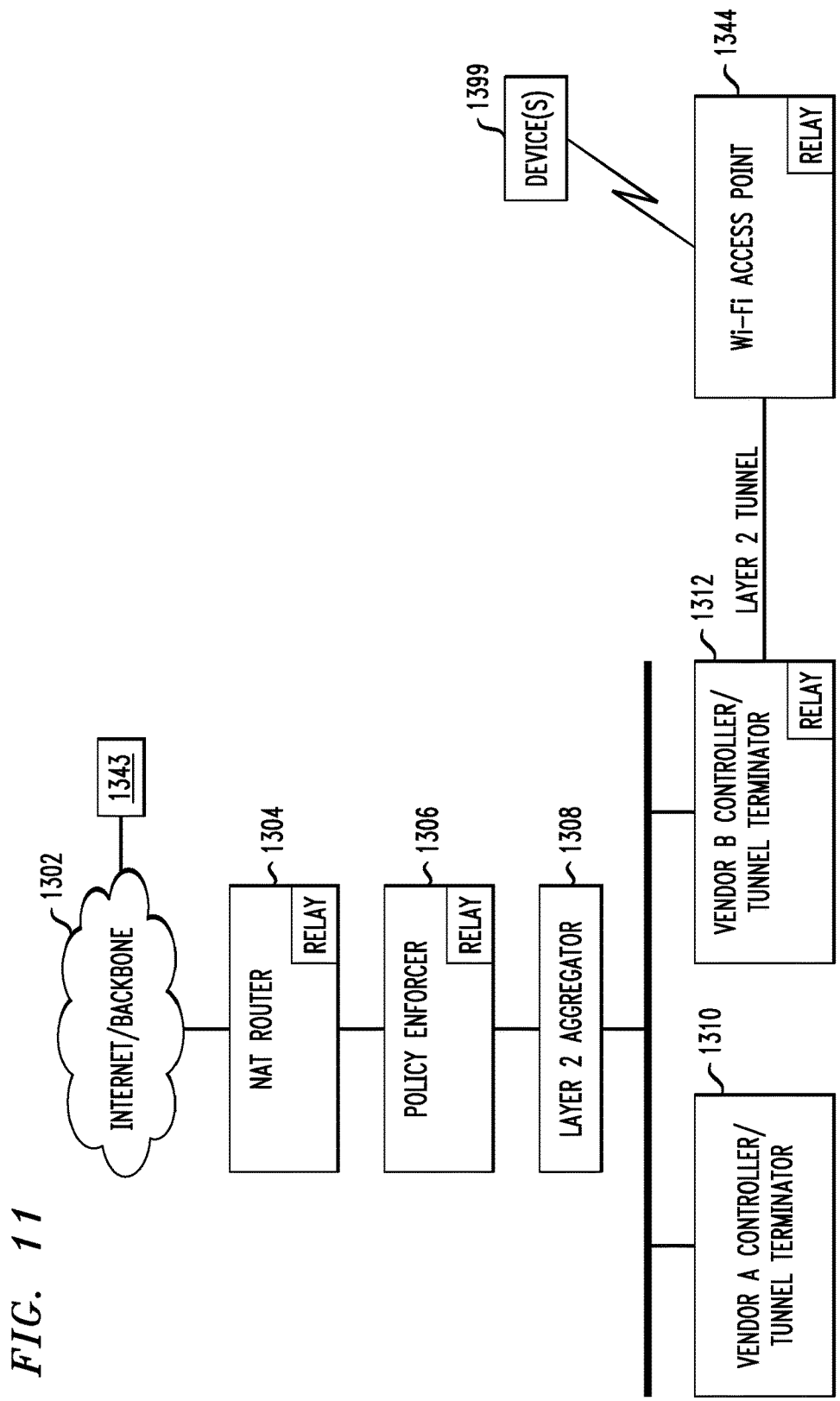
FIG. 11 shows an alternative embodiment in the context of a metropolitan Wi-Fi network.

Some embodiments are employed in the context of a metropolitan Wi-Fi ("Metro Wi-Fi") network, as seen in FIG. 11. In order to explain same, initially, consider again the HFC example, wherein both the cable modem (e.g., in CPE 106) and the devices communicating with same (e.g., PC 232) receive a DHCP lease. In some instances, there is a wired and/or wireless router between the cable modem and the device(s). Thus, in the HFC environment, the cable modem and devices connected to it interact with the DHCP server. Now, in the Metro Wi-Fi context, the DHCP comes directly from the device (e.g., lap-top computer or "smart" phone—omitted from FIG. 11) attached to the Wi-Fi network via wireless access point 1344. The device attaches to the Wi-Fi network via access point 1344, which bridges the traffic up controller/tunnel terminator 1310, 1312) via a layer 2 tunnel. The controller/tunnel terminator 1310, 1312 forwards the traffic to the layer 2 aggregator 1308.

In Metro Wi-Fi, there are multiple components which can function as DHCP relay agents for connected devices. In some embodiments the Policy Enforcer 1306 is employed as the DHCP relay, but the relaying function can be moved between the NAT (network address translation) router 1304 and Policy Enforcer 1306. Router 1304 connects to Internet or backbone 1302.

Metro Wi-Fi access points (APs) 1344 forward all their layer 2 traffic to a vendor specific concentrator. Some vendors have concentrators which can relay DHCP, and some vendors have access points that can relay DHCP natively. The farther down the network the DHCP relaying is pushed, the more operationally complex it becomes to manage. If controllers or individual APs act as DHCP relays, it is appropriate in one or more embodiments to use the intermediary DHCP relay to abstract the actual backend DHCP server infrastructure from the devices. A typical network may have tens of thousands of APs 1344 deployed. Having a consistent DHCP configuration across all the devices is a significant benefit.

Thus, in FIG. 11, remote relay devices analogous to relay functionality on CMTS-es 801, 803 can be located, for example, at 1304, 1306, 1312, 1344, or the like; the relays are not separately numbered in FIG. 11 to avoid clutter. Device(s) 1399 are analogous to devices 813, 815, 817, 819 in FIG. 8. Block 1343 is analogous to DHCP intermediate relay 843 in FIG. 8. Behind block 1343 are elements analogous to elements 849, 851, 853, 854, 807, 831, 833, 835, 809, 837, 839, 841, 810, 838, 840, 842 in FIG. 8, which function in an analogous manner, except that note would be taken of which Wi-Fi access points were assigned to which DHCP server, instead of which CMTS-es were assigned to which DHCP server. Furthermore in this regard, the last sentence assumes that the remote relays are located in Wi-Fi access points 1344; if they were located in terminators 1310, 1312, note would be taken of which terminators were assigned to which DHCP server; if they were located in enforcer(s) 1306, note would be taken of which enforcer(s) were assigned to which DHCP server; and if they were located in NAT router(s) 1304, note would be taken of which NAT router(s) were assigned to which DHCP servers.

Given the discussion thus far, it will be appreciated that, in general terms, an exemplary method, according to an aspect of the invention, includes the step of obtaining, at an intermediary dynamic host configuration protocol relay device such as 843 (or 901 with load balancer), 1343, over a network such as 805, 1302 plus intermediate components (if any) in FIG. 11, a dynamic host configuration protocol message from one of a plurality of remote dynamic host configuration protocol relay devices (e.g., CMTSs 801, 803 or remote relays in 1304, 1306, 1312, or 1314) in communication with the intermediary dynamic host configuration protocol relay device over the network. This step could be carried out, for example, by relay software 847 running on a server on which intermediate relay 843, 1343 resides.

With regard to messages obtained by device 843, 1343 in one or more embodiments, UDP messages are employed. IP packets have a source and destination IP address. The destination IP address is that of the load balancer 909 where employed, and the load balancer rewrites the packet to have a destination IP address for one of the DHCP relay servers 903, 905, 907. If no balancer is used, the destination IP address is that of the relay device 843.

A further step includes accessing, by the intermediary dynamic host configuration protocol relay device, data pertaining to a plurality of dynamic host configuration protocol back-end servers (e.g., 807, 809, 810) logically fronted by the intermediary dynamic host configuration protocol relay device. This step could be carried out by software 847 running on the aforementioned server, accessing map data in a RAM of the server (the map data can be updated and loaded into RAM as described elsewhere herein). A still further step includes, based on information in the dynamic host configuration protocol message and the data pertaining to the plurality of dynamic host configuration protocol back-end servers, routing the dynamic host configuration protocol message to an appropriate one of the plurality of back-end dynamic host configuration protocol servers. This step could also be carried out by software 847 running on the aforementioned server.

In some cases, in the obtaining step, the remote dynamic host configuration protocol relay devices are cable modem termination systems 801, 803 and the network is a cable network ("pure" cable or HFC, for example). However, other embodiments may involve different contexts. For example, in some cases, in the obtaining step, the network is a municipal wireless network (e.g., Wi-Fi) and the remote dynamic host configuration protocol relay devices each comprise remote dynamic host configuration protocol relay devices located at one of a network address translation router 1304, a policy enforcer 1306, a tunnel terminator 1312, and a wireless access point 1344 of the municipal wireless network.

As an aside, it is worth noting that in FIG. 8, devices 813-819 represent cable modems (with devices behind them).

In some cases, in the accessing step, the data pertaining to the plurality of dynamic host configuration protocol back-end servers is map data 849 that maps given ones of the plurality of remote dynamic host configuration protocol relay devices 801, 803 to corresponding ones of the plurality of dynamic host configuration protocol back-end servers 807, 809, 810. In the routing step, the pertinent information in the dynamic host configuration protocol message includes at least an identifier of the remote dynamic host configuration protocol relay device in question.

Some embodiments further include updating the map data by receiving, at an aggregation server 851, an updated configuration file 835, 841, 842 from at least one of the plurality of dynamic host configuration protocol back-end servers 807, 809, 810; and updating the map data based on the updated configuration file. These steps can be carried out using the daemons, APIs, and server 851 with engine 853, as described elsewhere herein.

In some cases, in the routing step, the pertinent information in the dynamic host configuration protocol message further includes at least one data item in addition to the identifier of the remote dynamic host configuration protocol relay device in question. In some cases, in the routing step, the pertinent information in the dynamic host configuration protocol message is information other than the identifier of the remote dynamic host configuration protocol relay device in question.

In some cases, additional steps include detecting at least one conflict in the map data 849 between at least two of the plurality of dynamic host configuration protocol back-end servers 807, 809, 810; and resolving the conflict by giving priority to the dynamic host configuration protocol back-end server associated with the earliest time stamp. This step can be carried out, for example, by engine 853.

In some cases, both DHCPv4 and DHCPv6 can be handled. Thus, in some cases, in the obtaining and routing steps, the dynamic host configuration protocol message is a lease request, such as a DHCPv4 lease request, and the steps are repeated for a DHCPv6 lease request. Thus, in one or more embodiments, the dynamic host configuration protocol lease request is a DHCPv4 DHCPREQUEST packet or a DHCPv6 REQUEST message.

In some cases, the intermediary dynamic host configuration protocol relay device 843 modifies the dynamic host configuration protocol message to affect how the appropriate one of the plurality of back-end dynamic host configuration protocol servers 807, 809, 810 processes the message.

As noted, in a preferred but non-limiting approach, the relay 843 is implemented as shown at 901 in FIG. 9. As also noted, in a preferred but non-limiting approach, the relay software 847 and the map data are both kept in RAM on the machine implementing relay 843, for speed.

In some cases, a further step includes periodically re-assigning at least one of the plurality of dynamic host configuration protocol back-end servers 807, 809, 810 from one of the plurality of remote dynamic host configuration protocol relay devices to another one of the plurality of remote dynamic host configuration protocol relay devices; e.g., using work assignment engine 854 as described elsewhere herein.

In another aspect, an exemplary system includes an intermediary dynamic host configuration protocol relay device 843, 1343; a map database 849 in communication with the intermediary dynamic host configuration protocol relay device; and a plurality of dynamic host configuration protocol back-end servers 807, 809, 810 logically fronted by the intermediary dynamic host configuration protocol relay device. Aggregation server 851 is included in some embodiments. Any of the other elements in the figures can be included in some embodiments. Some embodiments include the components shown in FIG. 1; such embodiments may have a single NDC or two or more NDCs with redundancy.

System and Article of Manufacture Details

The invention can employ hardware aspects or a combination of hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). Appropriate interconnections via bus, network, and the like can also be included.

Figure 10:
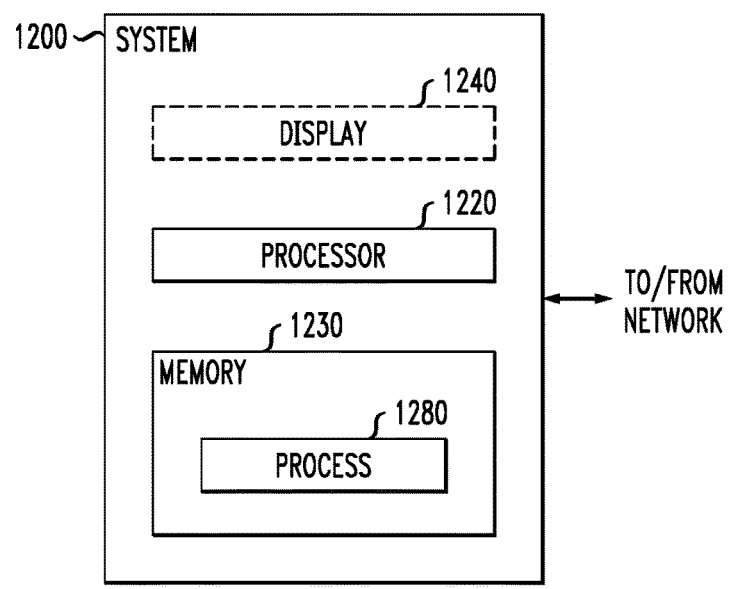
FIG. 10 is a block diagram of a computer system useful in connection with one or more aspects of the invention.

FIG. 10 is a block diagram of a system 1200 that can implement at least some aspects of the invention, and is representative, for example, of DHCP relay 843, 1343 and/or one or more of the servers shown in the figures. As shown in FIG. 10, memory 1230 configures the processor 1220 to implement one or more methods, steps, and functions (collectively, shown as process 1280 in FIG. 10). The memory 1230 could be distributed or local and the processor 1220 could be distributed or singular. Different steps could be carried out by different processors.

The memory 1230 could be implemented as an electrical, magnetic or optical memory, or any combination of these or other types of storage devices. It should be noted that if distributed processors are employed, each distributed processor that makes up processor 1220 generally contains its own addressable memory space. It should also be noted that some or all of computer system 1200 can be incorporated into an application-specific or general-use integrated circuit. For example, one or more method steps could be implemented in hardware in an ASIC rather than using firmware. Display 1240 is representative of a variety of possible input/output devices (e.g., keyboards, mice, and the like). Every processor may not have a display, keyboard, mouse or the like associated with it.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system (including, for example, system 1200 or processing capability on intermediate relay 843, 1343, or the like), to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass a transmission medium or disembodied signal.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program comprising computer program code means adapted to perform one or all of the steps of any methods or claims set forth herein when such program is run, for example, on a server implementing one or more of blocks/sub-blocks 843, 851, 807, 809, 810, 845, 847, 853, 831, 833, 835, 837, 839, 841, 838, 840, 842, 854 or analogous elements in other embodiments such as the Metro Wi-Fi embodiment of FIG. 11, and the like, and that such program may be embodied on a tangible computer readable recordable storage medium. As used herein, including the claims, unless it is unambiguously apparent from the context that only server software is being referred to, a "server" includes a physical data processing system (for example, system 800 as shown in FIG. 8) running a server program. It will be understood that such a physical server may or may not include a display, keyboard, or other input/output components. Furthermore, as used herein, including the claims, a "router" includes a networking device with both software and hardware tailored to the tasks of routing and forwarding information.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures (e.g. modules/sub-modules to implement blocks/sub-blocks 843, 851, 807, 809, 810, 845, 847, 853, 831, 833, 835, 837, 839, 841, 838, 840, 842, 854 or analogous elements in other embodiments such as the Metro Wi-Fi embodiment of FIG. 11). The method steps can then be carried out using the distinct software modules of the system, as described above, executing on one or more hardware processors. Further, a computer program product can include a tangible computer-readable recordable storage medium with code adapted to be executed to carry out one or more method steps described herein, including the provision of the system with the distinct software modules.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:
1. A method comprising the steps of:
 obtaining, at an intermediary dynamic host configuration protocol relay device connected between a plurality of remote dynamic host configuration protocol relay devices and a plurality of dynamic host configuration protocol back-end servers, over a network, a dynamic host configuration protocol message from one of said plurality of remote dynamic host configuration protocol relay devices;

accessing, by said intermediary dynamic host configuration protocol relay device, from a mapping database, configuration data pertaining to said plurality of dynamic host configuration protocol back-end servers logically fronted by said intermediary dynamic host configuration protocol relay device; and based on information in said dynamic host configuration protocol message and said configuration data pertaining to said plurality of dynamic host configuration protocol back-end servers, routing by said intermediary dynamic host configuration protocol relay device, said dynamic host configuration protocol message to an appropriate one of said plurality of dynamic host configuration protocol back-end servers;

wherein said configuration data pertaining to said plurality of dynamic host configuration protocol back-end servers comprises map data that maps given ones of said plurality of remote dynamic host configuration protocol relay devices to corresponding ones of said plurality of dynamic host configuration protocol back-end servers; and wherein said information in said dynamic host configuration protocol message comprises a request for at least one of the plurality of dynamic host configuration protocol back-end servers to provide client configuration information.

2. The method of claim 1, further comprising updating said mapping database by an aggregation server when the aggregation server receives an updated configuration file from at least one of said plurality of dynamic host configuration protocol back-end servers.

3. The method of claim 2, wherein a single physical server comprises said intermediary dynamic host configuration protocol relay device and said aggregation server.

4. The method of claim 3, wherein said single physical server further comprises said mapping database.

5. The method of claim 1, wherein said information in said dynamic host configuration protocol message further comprises an identifier of said one of said plurality of remote dynamic host configuration protocol relay devices.

6. The method of claim 5, wherein said information in said dynamic host configuration protocol message further comprises at least one data item in addition to said identifier of said one of said plurality of remote dynamic host configuration protocol relay devices.

7. The method of claim 1, wherein, in said obtaining step, said remote dynamic host configuration protocol relay devices comprise cable modem termination systems and said network comprises a cable network.

8. The method of claim 1, wherein, in said obtaining step, said network comprises a municipal wireless network and said remote dynamic host configuration protocol relay devices each comprise remote dynamic host configuration protocol relay devices located at one of a network address translation router, a policy enforcer, a tunnel terminator, and a wireless access point of said municipal wireless network.

9. The method of claim 1, further comprising:
detecting at least one conflict in said map data between at least two of said plurality of dynamic host configuration protocol back-end servers; and resolving said conflict by giving priority to one of said at least two of said plurality of dynamic host configuration protocol back-end servers associated with an earliest time stamp.

10. The method of claim 1, wherein, in said obtaining and routing steps, said dynamic host configuration protocol message comprises a DHCPv4 lease request, further comprising:

obtaining, at said intermediary dynamic host configuration protocol relay device, over a network, a DHCPv6 lease request from another one of said plurality of remote dynamic host configuration protocol relay devices;

accessing, by said intermediary dynamic host configuration protocol relay device, said configuration data pertaining to said plurality of dynamic host configuration protocol back-end servers logically fronted by said intermediary dynamic host configuration protocol relay device; and based on information in said DHCPv6 lease request and said configuration data pertaining to said plurality of dynamic host configuration protocol back-end servers, routing said DHCPv6 lease request to another appropriate one of said plurality of dynamic host configuration back-end protocol servers.

11. The method of claim 1, further comprising said intermediary dynamic host configuration protocol relay device modifying said dynamic host configuration protocol message to affect how said appropriate one of said plurality of dynamic host configuration protocol back-end servers processes said dynamic host configuration protocol message.

12. The method of claim 1, further comprising periodically re-assigning at least one of said plurality of dynamic host configuration protocol back-end servers from one of said plurality of remote dynamic host configuration protocol relay devices to another one of said plurality of remote dynamic host configuration protocol relay devices.

13. The method of claim 1, wherein said configuration data is obtained at least in part from the plurality of dynamic host configuration protocol back-end servers and aggregated in said mapping database.

14. The method of claim 1, wherein said request for at least one of the plurality of dynamic host configuration protocol back-end servers to provide client configuration information comprises a dynamic host configuration protocol lease request.

15. The method of claim 1, wherein said request for at least one of the plurality of dynamic host configuration protocol back-end servers to provide client configuration information comprises at least one of: a DHCPv4 DHCPDISCOVER packet, a DHCPv4 DHCPREQUEST packet, a DHCPv6 SOLICIT message, and a DHCPv6 REQUEST message.

16. The method of claim 1, wherein said request for at least one of the plurality of dynamic host configuration protocol back-end servers to provide client configuration information comprises at least one of: a DHCPv6 RENEW message, a DHCPv6 REBIND message, a DHCPv6 INFORMATION-REQUEST message, a DHCPv6 CONFIRM message, a DHCPv6 RELEASE message, or a DHCPv6 DECLINE message.

17. The method of claim 1, wherein a single physical server comprises said intermediary dynamic host configuration protocol relay device and said mapping database.

18. An intermediary dynamic host configuration protocol relay device connected between a plurality of remote dynamic host configuration protocol relay devices and a plurality of dynamic host configuration protocol back-end servers over a network, the intermediary dynamic host configuration protocol relay device comprising:
- a memory; and
- at least one processor, coupled to said memory and operative to:
  - obtain, over said network, a dynamic host configuration protocol message from one of said plurality of remote dynamic host configuration protocol relay devices in communication with said intermediary dynamic host configuration protocol relay device over said network;
  - access from a mapping database, configuration data pertaining to said plurality of dynamic host configuration protocol back-end servers logically fronted by said intermediary dynamic host configuration protocol relay device; and
  - based on information in said dynamic host configuration protocol message and said configuration data pertaining to said plurality of dynamic host configuration protocol back-end servers, route said dynamic host configuration protocol message to an appropriate one of said plurality of dynamic host configuration protocol back-end servers;
- wherein said configuration data pertaining to said plurality of dynamic host configuration protocol back-end servers comprises map data that maps given ones of said plurality of remote dynamic host configuration protocol relay devices to corresponding ones of said plurality of dynamic host configuration protocol back-end servers; and
- wherein said information in said dynamic host configuration protocol message comprises a request for at least one of the plurality of dynamic host configuration protocol back-end servers to provide client configuration information.

19. An apparatus comprising:
- means for obtaining, using an intermediary dynamic host configuration protocol relay device connected between a plurality of remote dynamic host configuration protocol relay devices and a plurality of dynamic host configuration protocol back-end servers, over a network, a dynamic host configuration protocol message from one of said plurality of remote dynamic host configuration protocol relay devices;
- means for accessing, by said intermediary dynamic host configuration protocol relay device, from a mapping database, configuration data pertaining to said plurality of dynamic host configuration protocol back-end servers logically fronted by said intermediary dynamic host configuration protocol relay device; and
- means for, based on information in said dynamic host configuration protocol message and said data pertaining to said plurality of dynamic host configuration protocol back-end servers, routing by said intermediary dynamic host configuration protocol relay device, said dynamic host configuration protocol message to an appropriate one of said plurality of dynamic host configuration protocol back-end servers;
- wherein said configuration data pertaining to said plurality of dynamic host configuration protocol back-end servers comprises map data that maps given ones of said plurality of remote dynamic host configuration protocol relay devices to corresponding ones of said plurality of dynamic host configuration protocol back-end servers; and
- wherein said information in said dynamic host configuration protocol message comprises a request for at least one of the plurality of dynamic host configuration protocol back-end servers to provide client configuration information.

20. A system comprising:
- an intermediary dynamic host configuration protocol relay device;
- a map database in communication with said intermediary dynamic host configuration protocol relay device; and
- a plurality of dynamic host configuration protocol back-end servers logically fronted by said intermediary dynamic host configuration protocol relay device;
- wherein:
  - said intermediary dynamic host configuration protocol relay device is connected between a plurality of remote dynamic host configuration protocol relay devices and said plurality of dynamic host configuration protocol back-end servers over a network;
  - said intermediary dynamic host configuration protocol relay device comprises at least one processor coupled to a memory and operative to:
    - obtain, over said network, a dynamic host configuration protocol message from one of said plurality of remote dynamic host configuration protocol relay devices in communication with said intermediary dynamic host configuration protocol relay device over said network;
    - configured to access said map database, said map database containing configuration data pertaining to said plurality of dynamic host configuration protocol back-end servers logically fronted by said intermediary dynamic host configuration protocol relay device; and
    - based on information in said dynamic host configuration protocol message and said data pertaining to said plurality of dynamic host configuration protocol back-end servers, route said dynamic host configuration protocol message to an appropriate one of said plurality of dynamic host configuration protocol back-end servers;
  - said configuration data pertaining to said plurality of dynamic host configuration protocol back-end servers comprises map data that maps given ones of said plurality of remote dynamic host configuration protocol relay devices to corresponding ones of said plurality of dynamic host configuration protocol back-end servers; and
  - said information in said dynamic host configuration protocol message comprises a request for at least one of the plurality of dynamic host configuration protocol back-end servers to provide client configuration information.

* * * * *